US008823678B2

(12) United States Patent
Li et al.

(10) Patent No.: US 8,823,678 B2
(45) Date of Patent: Sep. 2, 2014

(54) WATERPROOF BASELINE TRACKING IN CAPACITIVE TOUCH CONTROLLERS

(75) Inventors: Tianhao Li, Tustin, CA (US); David Amory Sobel, Los Altos, CA (US); Satish Vithal Joshi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 195 days.

(21) Appl. No.: 13/410,844

(22) Filed: Mar. 2, 2012

(65) Prior Publication Data

US 2013/0176268 A1 Jul. 11, 2013

Related U.S. Application Data

(60) Provisional application No. 61/584,445, filed on Jan. 9, 2012.

(51) Int. Cl.
*G09G 5/00* (2006.01)
(52) U.S. Cl.
USPC .................................. 345/174; 178/18.06
(58) Field of Classification Search
USPC ......... 345/173–178; 178/18.03–18.09, 18.11; 715/863, 864
See application file for complete search history.

(56) References Cited

U.S. PATENT DOCUMENTS

| 4,291,303 | A | * | 9/1981 | Cutler et al. | 345/174 |
|---|---|---|---|---|---|
| 6,927,384 | B2 | * | 8/2005 | Reime et al. | 250/221 |
| 7,277,087 | B2 | * | 10/2007 | Hill et al. | 345/173 |
| 8,546,705 | B2 | * | 10/2013 | Chang et al. | 178/18.06 |
| 2004/0178998 | A1 | * | 9/2004 | Sharp et al. | 345/177 |
| 2005/0146512 | A1 | * | 7/2005 | Hill et al. | 345/173 |
| 2008/0218535 | A1 | | 9/2008 | Forstall et al. | |
| 2009/0255737 | A1 | * | 10/2009 | Chang et al. | 178/18.06 |
| 2009/0303194 | A1 | | 12/2009 | Kumamoto | |
| 2010/0253640 | A1 | | 10/2010 | Zhan et al. | |
| 2010/0259505 | A1 | * | 10/2010 | Chang | 345/174 |
| 2011/0122091 | A1 | * | 5/2011 | King et al. | 345/175 |
| 2012/0050214 | A1 | * | 3/2012 | Kremin et al. | 345/174 |
| 2012/0223911 | A1 | | 9/2012 | Westhues | |
| 2012/0268411 | A1 | * | 10/2012 | Chen et al. | 345/174 |

\* cited by examiner

*Primary Examiner* — Tom Sheng
(74) *Attorney, Agent, or Firm* — Brinks Gilson & Lione

(57) ABSTRACT

A method for a touch panel control circuit includes stimulating a touch panel and receiving signals responsive to the stimulating. Based on the received signals, water or another contaminant may be determined to be present on the touch panel. While the contaminant is present on the touch panel, a wet baseline mode of operation in which a different baseline value is used to detect a touch condition for the touch panel. When the contaminant is removed, operation returns to a dry baseline mode.

19 Claims, 16 Drawing Sheets

Figure 1:
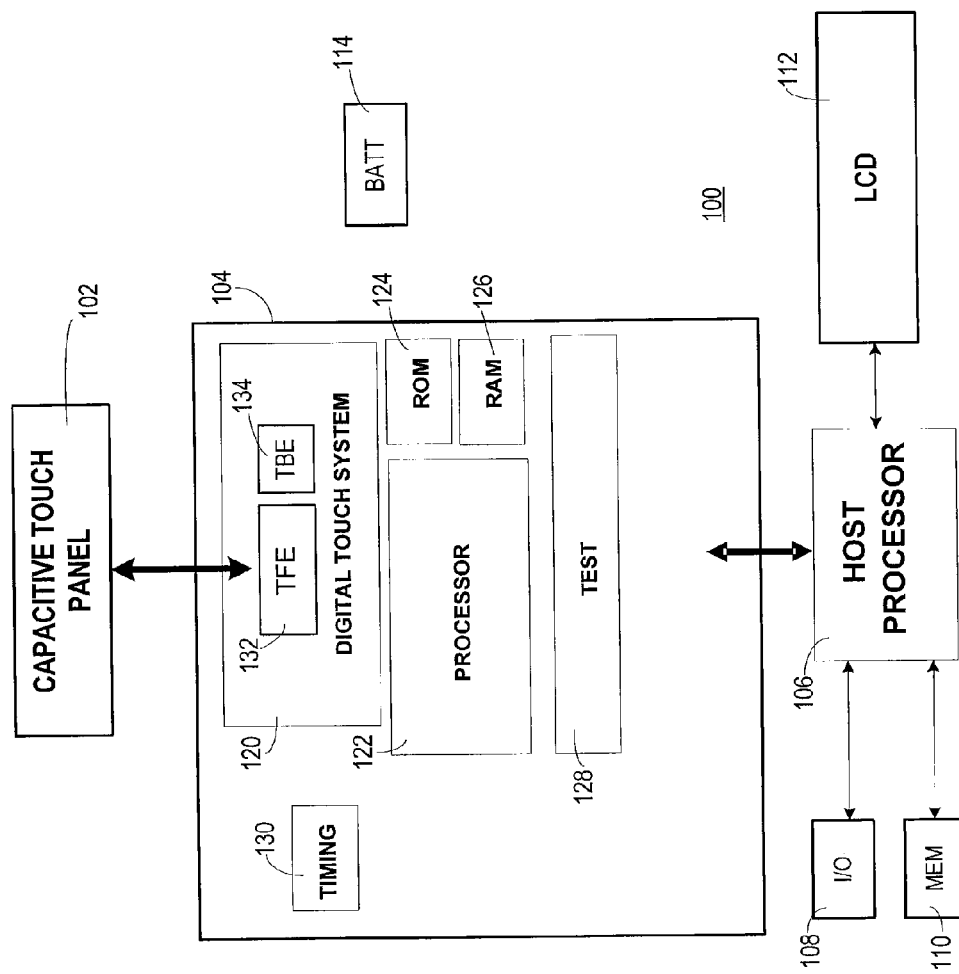

| | | | | | | | |
|---|---|---|---|---|---|---|---|
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |

Row Index: 0, 1, 2, 3, 4, 5, 6, 7

Column Index: 0, 1, 2, 3

500

Figure 5

|   | 0 | 1 | 2 | 3 | 4 |
|---|---|---|---|---|---|
| 0 | 2 | 2 | 2 | 2 | 2 |
| 1 | 2 | 2 | 2 | 2 | 2 |
| 2 | 2 | 2 | 2 | 2 | 2 |
| 3 | 2 | 2 | 2 | 2 | 2 |
| 4 | 2 | 2 | 2 | 2 | 2 |
| 5 | 4 | 4 | 4 | 4 | 4 |
| 6 | 4 | 4 | 4 | 4 | 4 |
| 7 | 4 | 4 | 4 | 4 | 4 |

Row Index / Column Index

600

Figure 6

WATERPROOF BASELINE TRACKING IN CAPACITIVE TOUCH CONTROLLERS

1. CROSS-REFERENCE TO RELATED APPLICATIONS

The present application claims the benefit of the filing date under 35 U.S.C. §119(e) of Provisional U.S. Patent Application Ser. No. 61/584,445 filed Jan. 9, 2012, the entire contents of which are incorporated herein by reference.

2. TECHNICAL FIELD

This disclosure relates to methods and apparatus for capacitive touch screen devices.

3. BACKGROUND

Continual development and rapid improvement in portable devices has included the incorporation of touch screens in these devices. A touch screen device responds to a user's touch to convey information about that touch to a control circuit of the portable device. The touch screen is conventionally combined with a generally coextensive display device such as a liquid crystal display (LCD) to form a user interface for the portable device. The touch screen also operates with a touch controller circuit to form a touch screen device. In other applications using touch sensing, touch pads may also be part of the user interface for a device such as a personal computer, taking the place of a separate mouse for user interaction with the onscreen image. Relative to portable devices that include a keypad, rollerball, joystick or mouse, the touch screen device provides advantages of reduced moving parts, durability, resistance to contaminants, simplified user interaction and increased user interface flexibility.

Despite these advantages, conventional touch screen devices have been limited in their usage to date. For some devices, current drain has been too great. Current drain directly affects power dissipation which is a key operating parameter in a portable device. For other devices, performance such as response time has been poor, especially when subjected to fast motion at the surface of the touch screen. Some devices do not operate well in environments with extreme conditions for electromagnetic interference and contaminants that can affect performance.

Further limitations and disadvantages of conventional and traditional approaches will become apparent to one of ordinary skill in the art through comparison of such approaches with aspects of the present disclosure as set forth in the remainder of this application and with reference to the accompanying drawings.

4. BRIEF DESCRIPTION OF THE DRAWINGS

The system may be better understood with reference to the following drawings and description. In the figures, like reference numerals designate corresponding parts throughout the different views.

Figure 3:
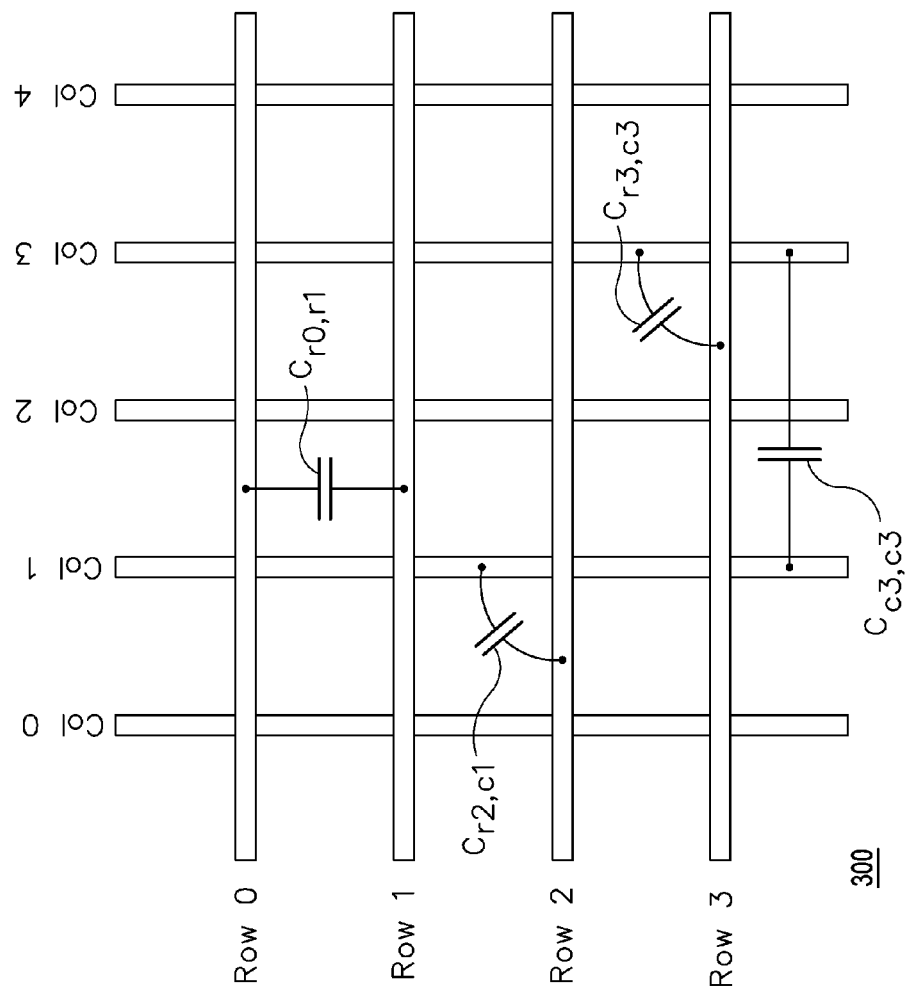
Figure 4:
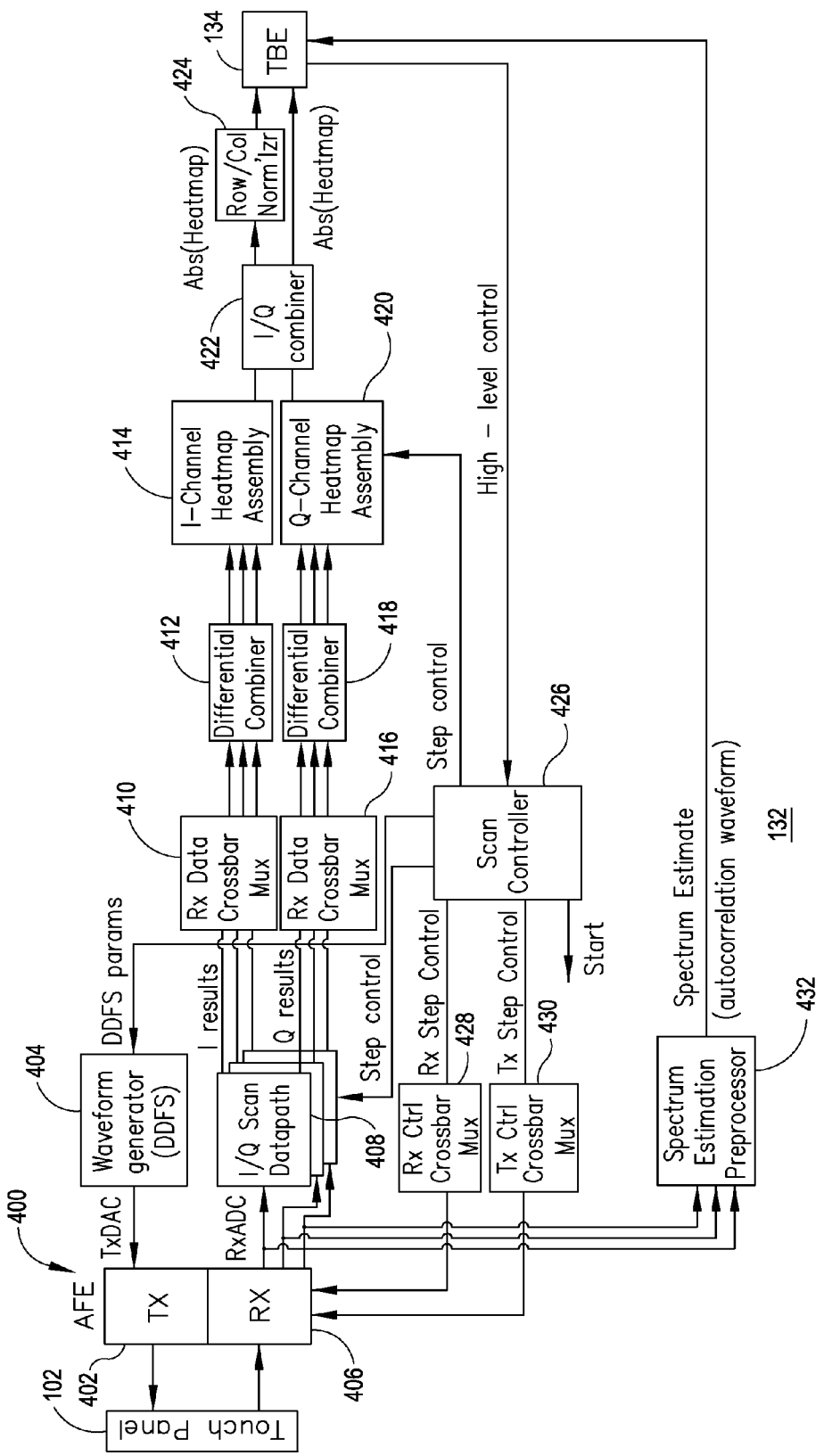
Figure 7:
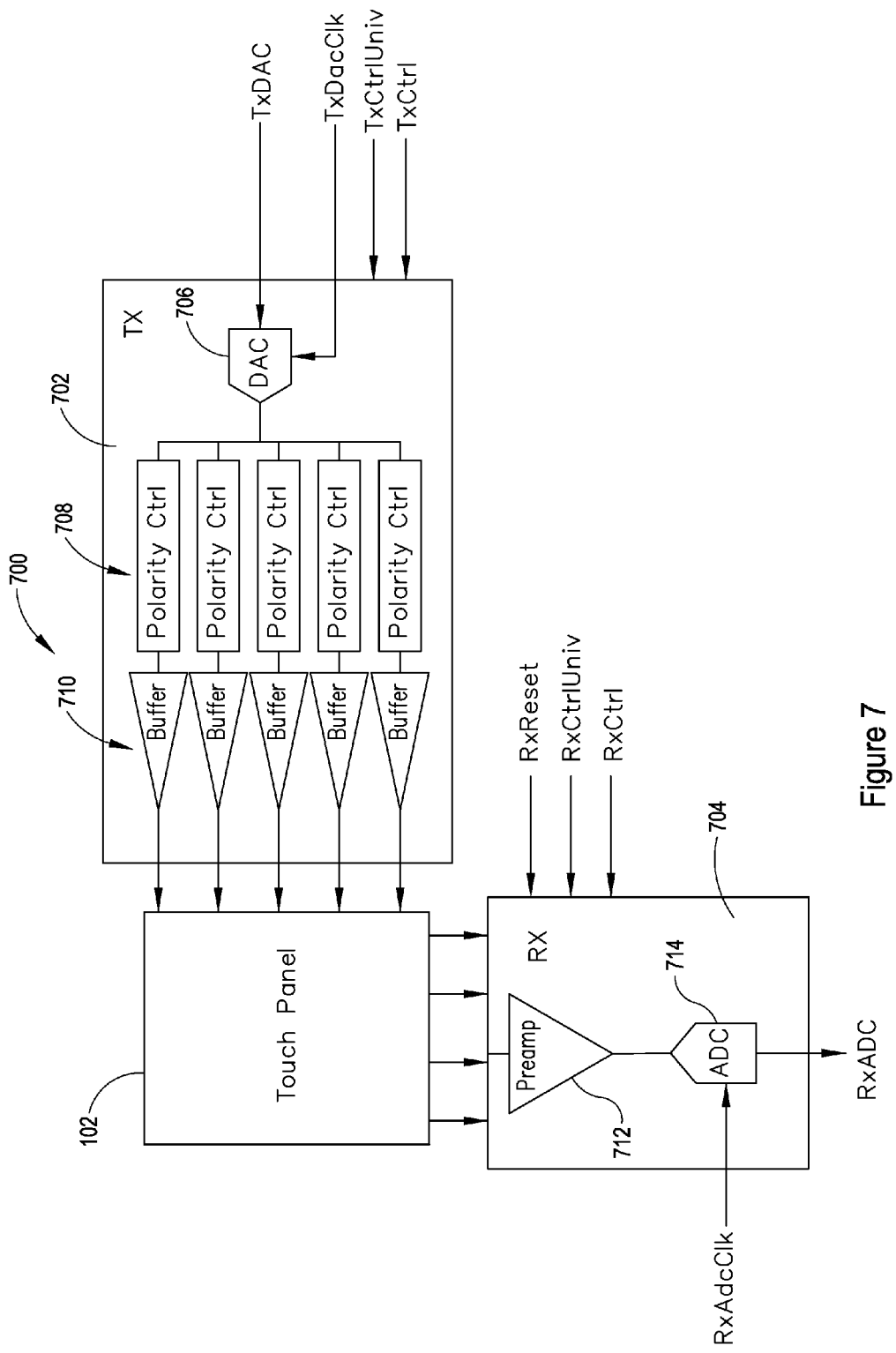
Figure 8:
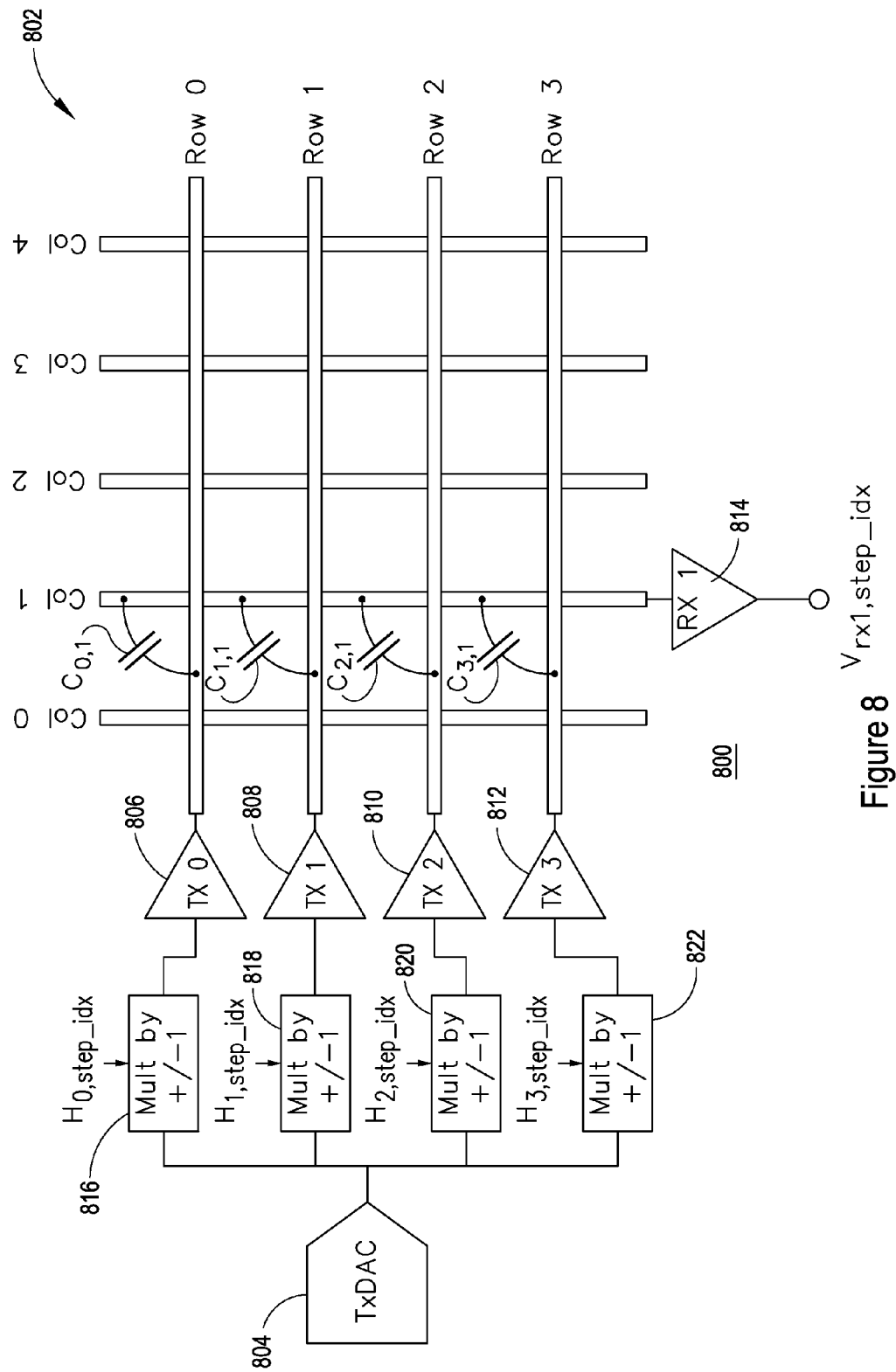
Figure 9:
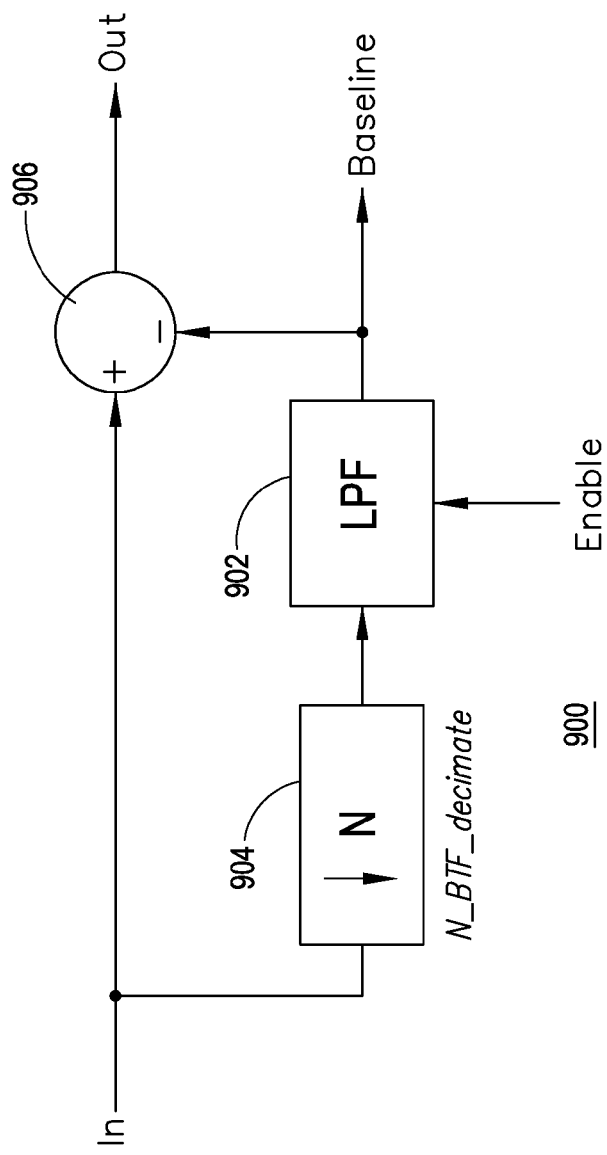
Figure 10:
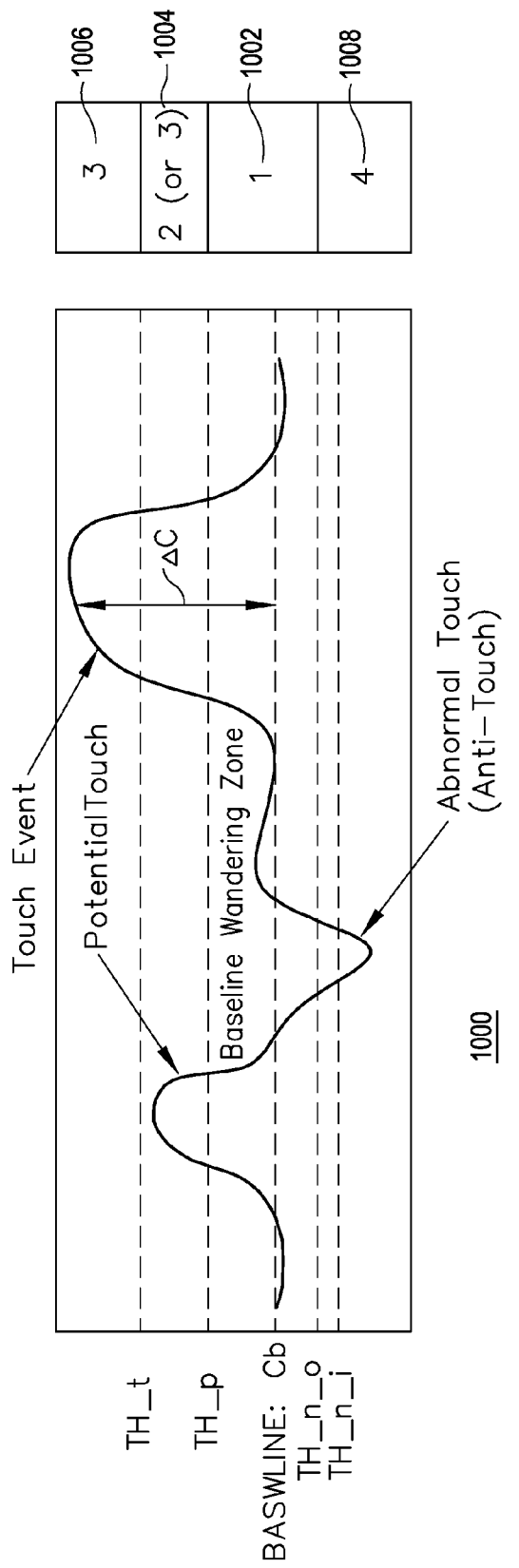
Figure 11:
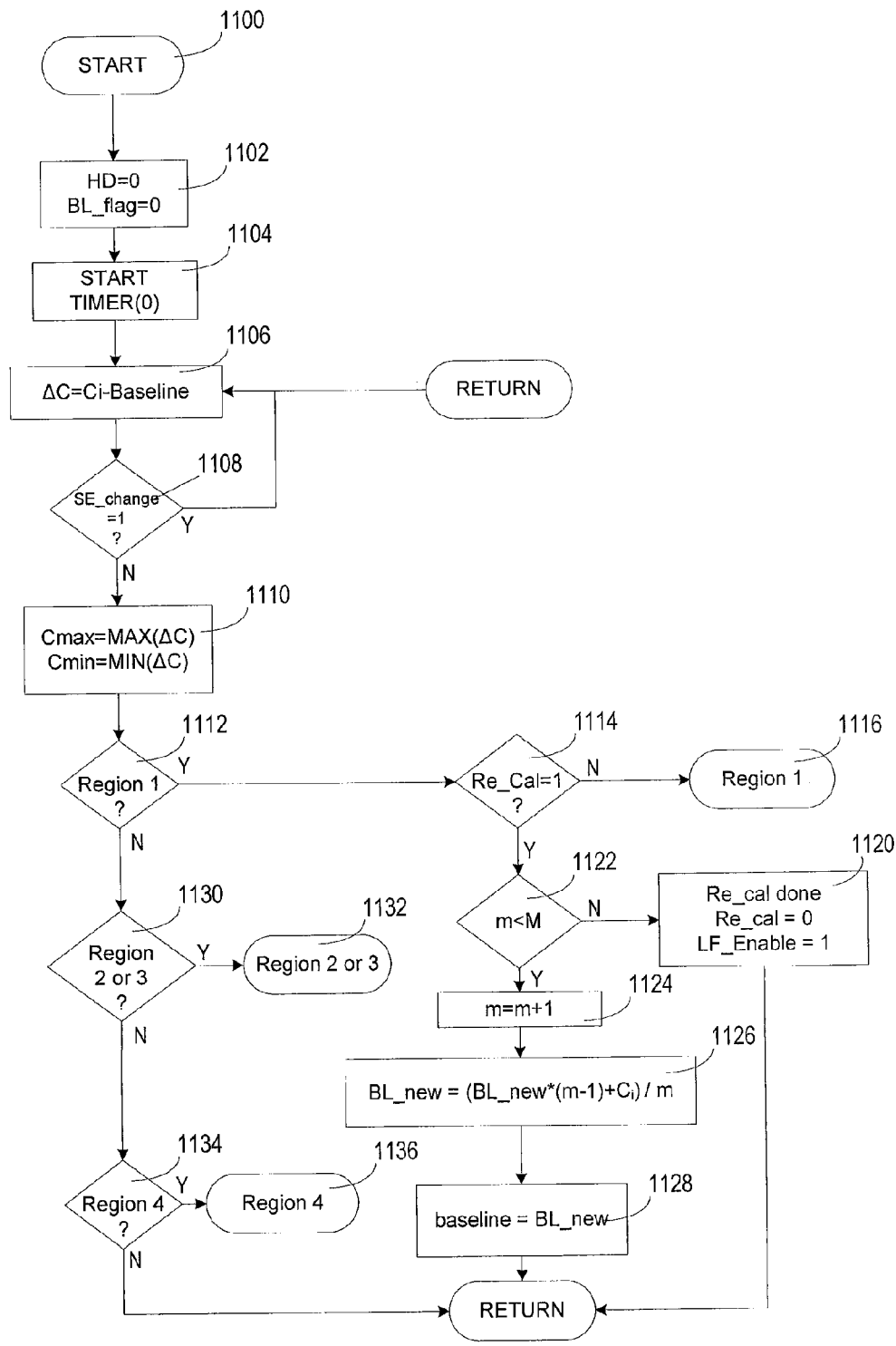
Figure 15:
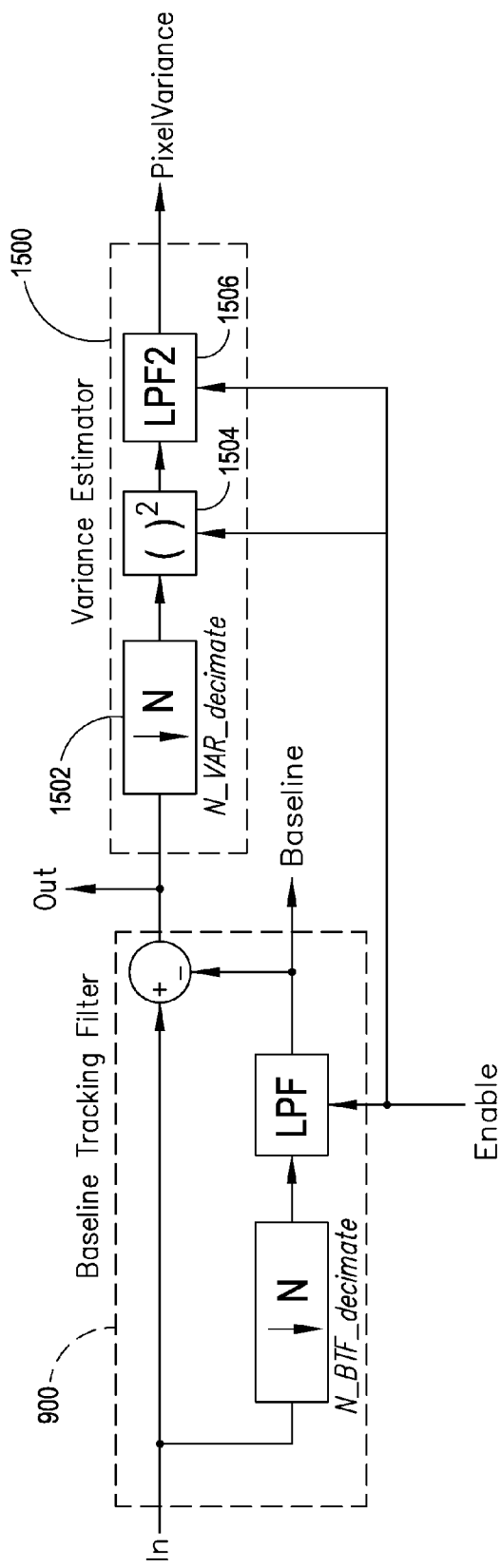
Figure 16:
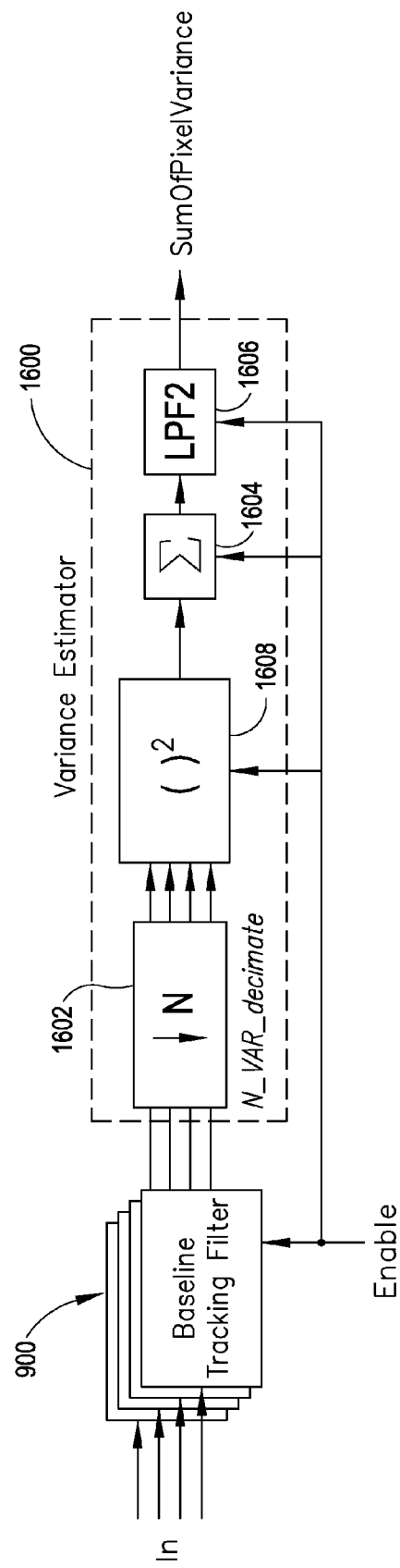

FIG. 1 is a block diagram of an exemplary portable device.
FIG. 2 is a top view of an exemplary portable device.
FIG. 3 is a simplified diagram of an exemplary mutual capacitance touch panel for use in the portable device of FIGS. 1 and 2.
FIG. 4 shows an exemplary block diagram of the touch front end of the portable device of FIG. 1.
FIG. 5 shows an exemplary first sample scan map.
FIG. 6 shows an exemplary second sample scan map.
FIG. 7 shows an exemplary high-level architecture of the touch front end of the portable device of FIG. 1.
FIG. 8 shows a simplified capacitive touch panel and related circuitry.
FIG. 9 illustrates an exemplary baseline tracking filter for use in a controller circuit for a portable device.
FIG. 10 is a plot of detected capacitance value for different operating conditions of a capacitive touch panel display.
FIGS. 11-14 are a flow chart illustrating operation of the baseline tracking operation for use in a controller circuit for a portable device.
FIG. 15 shows a first variance estimator in conjunction with the baseline tracking filter of FIG. 9.
FIG. 16 shows a second variance estimator in conjunction with the baseline tracking filter of FIG. 9.

5. DETAILED DESCRIPTION

Referring now to FIGS. 1 and 2, FIG. 1 shows a block diagram of a portable device 100. FIG. 2 one embodiment of a portable device 100 according to the block diagram of FIG. 1. As shown in FIG. 1, the portable device 100 includes a capacitive touch panel 102, a controller circuit 104, a host processor 106, input-output circuit 108, memory 110, a liquid crystal display (LCD) 112 and a battery 114 to provide operating power.

Figure 2B:
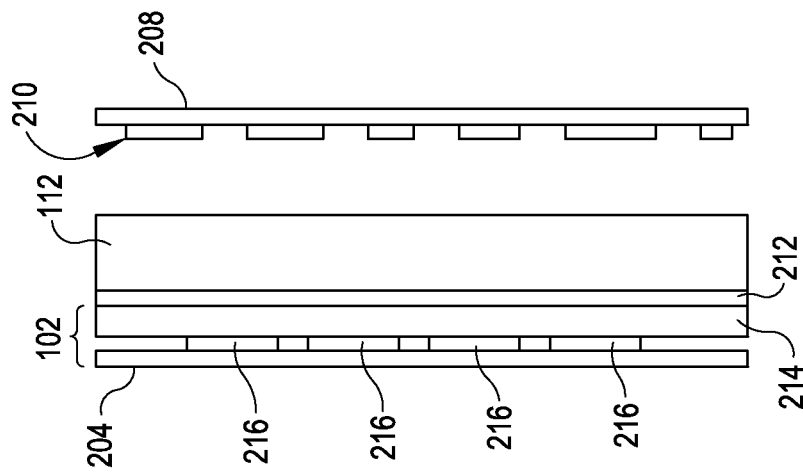
Figure 2A:
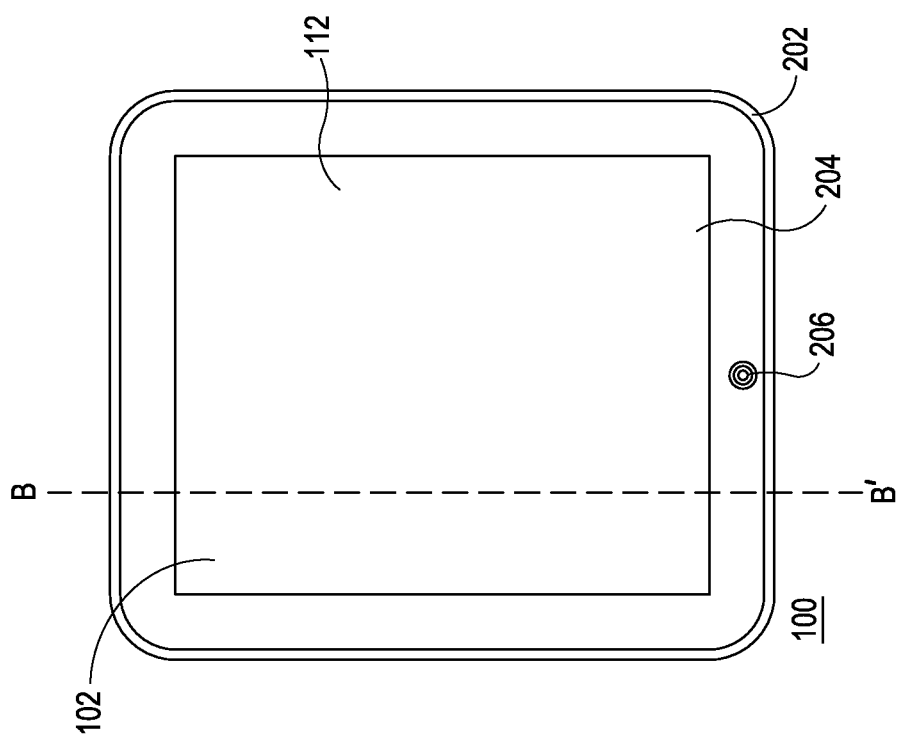

FIG. 2 includes FIG. 2A which shows a top view of the portable device 100 and FIG. 2B which shows a cross-sectional view of the portable device 200 along the line B-B' in FIG. 2A. The portable device may be embodied as the widest variety of devices including as a tablet computer, a smart phone, or even as a fixed device with a touch-sensitive surface or display.

The portable device 100 includes a housing 202, a lens or clear touch surface 204 and one or more actuatable user interface elements such as a control switch 206. Contained within the housing are a printed circuit board 208 circuit elements 210 arranged on the printed circuit board 208 and as are shown in block diagram form in FIG. 1. The capacitive touch panel 102 is arranged in a stack and includes a drive line 212, an insulator 214 and a sense line 216. The insulator electrically isolates the drive line 212 and other drive lines arranged parallel to the drive line from the sense lines 216. Signals are provided to one or more of the drive lines 212 and sensed by the sense lines 216 to locate a touch event on the clear touch surface 204. The LCD 112 is located between the printed circuit board 208 and the capacitive touch panel 102.

As is particularly shown in FIG. 2A, the capacitive touch panel 102 and the LCD 112 may be generally coextensive and form a user interface for the portable device. Text and images may be displayed on the LCD for viewing and interaction by a user. The user may touch the capacitive touch panel 102 to control operation of the portable device 100. The touch may be by a single finger of the user or by several fingers, or by other portions of the user's hand or other body parts. The touch may also be by a stylus gripped by the user or otherwise brought into contact with the capacitive touch panel. Touches may be intentional or inadvertent. In another application, the capacitive touch panel 102 may be embodied as a touch pad of a computing device. In such an application, the LCD 112 need not be coextensive (or co-located) with the capacitive touch panel 102 but may be located nearby for viewing by a user who touches the capacitive touch panel 102 to control the computing device.

Referring again to FIG. 1, the controller circuit 104 includes a digital touch system 120, a processor 122, memory including persistent memory 124 and read-write memory 126, a test circuit 128 and a timing circuit 130. In one embodiment, the controller circuit 104 is implemented as a single integrated circuit including digital logic and memory and analog functions.

The digital touch subsystem 120 includes a touch front end (TFE) 132 and a touch back end (TBE) 134. This partition is not fixed or rigid, but may vary according to the high-level function(s) that each block performs and that are assigned or considered front end or back end functions. The TFE 132 operates to detect the capacitance of the capacitive sensor that comprises the capacitive touch-panel 102 and to deliver a high signal to noise ratio (SNR) capacitive image (or heatmap) to the TBE 134. The TBE 134 takes this capacitive heatmap from the TFE 132 and discriminates, classifies, locates, and tracks the object(s) touching the capacitive touch panel 102 and reports this information back to the host processor 106. The TFE 132 and the TBE 134 may be partitioned among hardware and software or firmware components as desired, e.g., according to any particular design requirements. In one embodiment, the TFE 132 will be largely implemented in hardware components and some or all of the functionality of the TBE 134 may be implemented by the processor 122.

The processor 122 operates in response to data and instructions stored in memory to control the operation of the controller circuit 104. In one embodiment, the processor 122 is a reduced instruction set computer (RISC) architecture, for example as implemented in an ARM processor available from ARM Holdings. The processor 122 receives data from and provides data to other components of the controller circuit 104. The processor 122 operates in response to data and instructions stored in the persistent memory 124 and read-write memory 126 and in operation writes data to the memories 124, 126. In particular, the persistent memory 124 may store firmware data and instructions which are used by any of the functional blocks of the controller circuit 104. These data and instructions may be programmed at the time of manufacture of the controller 104 for subsequent use, or may be updated or programmed after manufacture.

The timing circuit 130 produces clock signals and analog, time-varying signals for use by other components of the controller circuit 104. The clock signals include digital clock signals for synchronizing digital components such as the processor 122. The time-varying signals include signals of predetermined frequency and amplitude for driving the capacitive touch panel 102. In this regard, the timing circuit 130 may operate under control or responsive to other functional blocks such as the processor 122 or the persistent memory 124.

FIG. 3 shows a diagram of a typical mutual capacitance touch panel 300. The capacitive touch panel 300 models the capacitive touch panel 102 of the portable device of FIGS. 1 and 2. The capacitive touch panel 300 has $N_{row}$ rows and $N_{col}$ columns ($N_{row}$=4, $N_{col}$=5 in FIG. 3). In this manner, the capacitive touch panel 300 creates $N_{row}$-times-$N_{col}$ mutual capacitors between the $N_{row}$ rows and the $N_{col}$ columns. These are the mutual capacitances that the controller circuit 104 commonly uses to sense touch, as they create a natural grid of capacitive nodes that the controller circuit 104 uses to create the typical capacitive heatmap. However, it is worth noting that there are a total of ($N_{row}$+$N_{col}$)—or ($N_{row}$+$N_{col}$+2) nodes if a touching finger or stylus and ground node in the capacitive touch panel 300 are included. A capacitance exists between every pair of nodes in the capacitive touch panel 300.

Stimulus Modes

The capacitive touch panel 300 can be stimulated in several different manners. The way in which the capacitive touch panel 300 is stimulated impacts which of the mutual capacitances within the panel are measured. A list of the modes of operation is detailed below. Note that the modes defined below only describe the manner in which the TFE 132 stimulates the panel.

Row-column (RC) mode is a first operating mode of a mutual capacitive sensor. In RC mode, the rows are driven with transmit (TX) waveforms and the columns are connected to receive (RX) channels of the TFE 132. Therefore, the mutual capacitors between the rows and the columns are detected, yielding the standard $N_{row} \times N_{col}$ capacitive heatmap. In the example shown in FIG. 3, RC mode measures the capacitors labeled $C_{<i>}, C_{<j>}$, where <i> and <j> are integer indices of the row and column, respectively. Generally, there is no incremental value in supporting column-row (CR) mode, (e.g. driving the columns and sensing the rows), as it yields the same results as RC mode.

Self-capacitance column (SC) mode is a self-capacitance mode that may be supported by the controller 102. In SC mode, one or more columns are simultaneously driven and sensed. As a result, the total capacitance of all structures connected to the driven column can be detected.

In column-listening (CL) mode, the RX channels are connected to the columns of the capacitive touch panel 102 and the transmitter is turned off. The rows of the capacitive touch panel 102 will either be shorted to a low-impedance node (e.g. AC ground), or left floating (e.g. high-impedance). This mode is used to listen to the noise and interference present on the panel columns. The output of the RX channels will be fed to a spectrum estimation block (e.g. FFT block) in order to determine the appropriate signal frequencies to use and the optimal interference filter configuration, as will be described in further detail below.

Timing Terminology

Some terminology is introduced for understanding the various timescales by which results are produced within the TFE 132. The TFE 132 produces a capacitive heatmap by scanning all desired nodes of the capacitive touch panel 102 (e.g., all of the nodes, or some specified or relevant subset of all of the nodes). This process may be referred to as a frame scan; the frame scan may run at a rate referred to as the frame rate. The frame rate may be scalable. One exemplary frame rate include a frame rate of 250 Hz for single touch and a panel size less than or equal to 5.0 inches in size. A second exemplary frame rate is 200 Hz for single touch and a panel size greater than 5.0 inches. A third exemplary frame rate is 120 Hz minimum for 10 touches and a panel size of 10.1 inches. Preferably, the controller 104 can support all of these frame rates and the frame rate is configurable to optimize tradeoff of performance and power consumption for a given application. The term scan rate may be used interchangeably with the term frame rate.

The controller circuit 104 may assemble a complete frame scan by taking a number of step scans. Qualitatively, each step scan may result in a set of capacitive readings from the receivers, though this may not be strictly done in all instances. The controller circuit 104 may perform each step scan at the same or different step rate. For a row/column (RC) scan, where the transmitters are connected to the rows and the receivers are connected to the columns, it will take $N_{row}$ step scans to create a full frame scan. Assuming a tablet-sized capacitive touch panel 102 with size 40 rows×30 columns, the step rate may be at least 8 kHz to achieve a 200 Hz frame rate.

For all mutual-capacitance scan modes a touch event causes a reduction in the mutual capacitance measured. The capacitive heatmap that is created by the TFE 132 will be directly proportional to the measured capacitance. Therefore, a touch event in these scan modes will cause a reduction in the capacitive heatmap. For all self-capacitance scan modes, a touch event causes an increase in the capacitance measured. The capacitive heatmap that is created by the TFE 132 will be directly proportional to the measured capacitance. Therefore, a touch event in these scan modes will cause a local increase in the capacitive heatmap.

Referring now to FIG. 4, it shows a block diagram of the touch front end (TFE) 132 of FIG. 1. In the illustrated embodiment, the AFE 132 includes 48 physical transmit channels and 32 physical receive channels. Additionally, some embodiments of the AFE 132 may contain circuitry such as power regulation circuits, bias generation circuits, and clock generation circuitry. To avoid unduly crowding the drawing figure, such miscellaneous circuitry is not shown in FIG. 4.

The TFE 132 includes transmit channels 402, a waveform generation block 404, receive channels 406 and I/Q scan data paths 408. The transmit channels 402 and the receive channels 406 collectively may be referred to as the analog front end (AFE) 400. The TFE 132 further includes, for the in-phase results from the I/Q scan data path, a receive data crossbar multiplexer 410, a differential combiner 412 and an in-phase channel assembly block 414. Similarly for the quadrature results, the TFE 132 includes a receive data crossbar multiplexer 416, a differential combiner 418 and an in-phase channel assembly block 420. The in-phase results and the quadrature results are combined in an I/Q combiner 422. The absolute value of the data is provided to a row and column normalizer 424 and then made available to the touch back end (TBE) 134. Similarly, the heatmap phase information from the I/Q combiner 422 is provided to the TBE 134 as well.

The TFE 132 further includes a scan controller 426, read control crossbar multiplexer 428 and transmit control crossbar multiplexer 430. Further, the TFE 132 includes a spectrum estimation processor 426 as will be described below in further detail. The spectrum estimation processor 426 provides a spectrum estimate to the TBE 134. The scan controller 426 receives high level control signals from the TBE 134 to control which columns are provided with transmit signals and which rows are sensed.

The receive data crossbar multiplexers 410, 416 and the receive control crossbar multiplexer 428 together form a receive crossbar multiplexer. These two multiplexers are used to logically remap the physical receive TFE channels by remapping both their control inputs and data outputs. As such, the control signals routed to both multiplexers may be identical, as the remapping performed by the receive data multiplexers 410, 416 and the receive control multiplexer 428 needs to be identical.

The receive data crossbar multiplexers 410, 416 sit between the output of the I/O scan data path 408 and the heatmap assembly blocks 414, 420. The purpose of the receive data crossbar multiplexers 410, 416 is to enable the logical remapping of the receive channels. This in turn allows for logical remapping of the electrical connectors such as pins or balls which connect the integrated circuit including the controller 104 to other circuit components of the portable device 100. This will in turn enable greater flexibility in routing a printed circuit board from the integrated circuit including the controller 104 to the capacitive touch panel 102.

Since the I/Q scan data path 408 outputs complex results, the receive crossbar multiplexer may be able to route both the I and Q channels of the scan data path output. This can easily be achieved by instantiating two separate and identical crossbar multiplexers 410, 416. These two multiplexers will share the same control inputs.

The receive control crossbar multiplexer 428 sits between the scan controller 426 and the AFE 400. It is used to remap the per-channel receive control inputs going into the AFE 400. The structure of the receive control crossbar multiplexer 428 may be the same as for the receive data crossbar multiplexers 410, 416.

Since the Rx Ctrl crossbar is used in conjunction with the Rx Data crossbar to logically remap the RX channels, it may be programmed in conjunction with the Rx data crossbar. The programming of the receive control multiplexer 428 and the receive data crossbar multiplexers 410, 416 are not identical. Instead the programming may be configured so that the same AFE to controller channel mapping achieved in one multiplexer is implemented in the other.

The scan controller 426 forms the central controller that facilitates scanning of the capacitive touch panel 102 and processing of the output data in order to create the capacitive heatmap. The scan controller 426 operates in response to control signals from the TBE 134.

Scan Controller Modes of Operation

The scan controller 426 may support many different modes. A brief description of each mode is listed below. Switching between modes is typically performed at the request of the processor 122 (FIG. 1), with a few exceptions noted below.

Active scan mode is considered the standard mode of operation, where the controller 104 is actively scanning the capacitive touch panel 102 in order to measure the capacitive heatmap. Regardless of what form of panel scan is utilized, the scan controller 426 steps through a sequence of step scans in order to complete a single frame scan.

In single-frame mode, the controller initiates one single frame scan at the request of the processor 122. After the scan is complete, the capacitive heatmap data is made available to the processor 122 and the scan controller 426 suspends further operation until additional instructions are received from the processor 426. This mode is especially useful in chip debugging.

In single-step mode, the controller initiates one single step scan at the request of the processor 122. After the scan is complete, the outputs of the scan data path 408 are made available to the processor 122 and the scan controller 426 suspends further operation until additional instructions are received from the processor 122. This mode is especially useful in chip testing and debugging.

Idle scan mode is a mode initiated by the processor 122 in order to run the controller 104 in a lower-performance mode. Typically, this mode will be selected when the controller 122 does not detect an active touch on the screen of the capacitive touch panel 102, but still wants reasonably fast response to a new touch. Therefore, the controller 122 is still active and capable of processing the heatmap data produced by the TFE 132.

The primary differences between active scan mode and idle scan mode are twofold. First, the frame rate in idle scan mode will typically be slower than that used in active scan mode. Duty cycling of the AFE 400 and other power reduction modes will be used in order to reduce total power consumption of the controller 104 during idle scan. Second, the length of time used to generate a single frame scan may be shorter in idle scan mode than in active scan mode. This may be achieved by either shortening the duration of a step scan or by performing fewer step scans per frame. Reducing total frame scan time can further reduce power at the expense of reduced capacitive heatmap signal to noise ratio (SNR).

Spectrum estimation mode is used to measure the interference and noise spectrum coupling into the receive channels.

This measurement is then analyzed by the processor 122 to determine the appropriate transmit frequency and calculate the optimal filter coefficients for the filters within the scan data path 408. This mode is typically used with the Column Listening mode.

In spectrum estimation mode, most of the blocks of the TFE 132 in FIG. 4 are disabled. The scan controller 426, the AFE 400, and the spectrum estimation preprocessor 432 may be used. The transmit channel 402 of the AFE 400 is powered down, and the receive channel 406 of the AFE 400 records the background noise and interference signals that couple into the capacitive touch panel 102. The receive data from all of the channels of the AFE 400 are routed to the spectrum estimation preprocessor 432, which performs mathematical preprocessing on this data. The output of the spectrum estimation preprocessor 432 will be an N-point vector of 16-bit results, where N is approximately 200. The output of the spectrum estimation preprocessor 432 is handed off to the processor 122 for further analysis and determination of the appropriate transmit frequency to use. This process is described in greater detail below.

In addition to the functional modes described above, the controller 104 may have a set of sleep modes, where various functional blocks in the controller 104 are disabled and/or powered down completely.

A frame scan includes of a series of step scans. The structure of each step scan may be identical from step scan to the next within a given frame scan; however, the exact values of control data vary from step scan to step scan. Furthermore, the operation of a given frame scan may be determined by configuration parameters and may or may not affected by data values measured by the receive channel. One example of the frame scan logic that the controller circuit 104 may implement is shown below.

```
// Initialization
Set DDFS parameters;
Clear heatmap_memory;
// Step scan loop
For step_idx = 1 to num_step_scans {
    // Configure circuits according to step_idx
    Set scan_datapath_control to scan_datapath_parameters[step_idx];
    Assert Rx_reset and wait TBD clock cycles;
    Set AFE_control_inputs to AFE_parameters[step_idx];
    Deassert Rx_reset and wait TBD clock cycles;
    // Run step scan and collect data
    Send start signal to DDFS and scan data path;
    Wait for TBD clock cycles for step scan to complete;
    Pass datapath_results[step_idx] to heatmap assembly block
    // Incremental heatmap processing
} // step_idx loop
```

The incremental heatmap processing operation is described in greater detail below.

Multi-Transmit Support and Block Stimulation of the Panel

In order to achieve improved SNR in the capacitive heatmap, the controller circuit 104 provides support for multi-transmit (multi-Tx) stimulation of the capacitive control panel 102. Multi-Tx stimulation (or Multi-Tx) means that multiple rows of the panel are simultaneously stimulated with the transmit (Tx) signal, or a polarity-inverted version of the Tx signal, during each step scan. The number and polarity of the rows stimulated may be controlled through control registers in the AFE 400. The number of rows simultaneously stimulated during multi-Tx is defined as a parameter $N_{multi}$. $N_{multi}$ may be a constant value from step-to-step within a given frame and also from frame-to-frame.

If $N_{multi}$ rows are simultaneously stimulated during a step scan, it will take at least $N_{multi}$ step scans to resolve all the pixel capacitances being stimulated. Each receiver has $N_{multi}$ capacitances being stimulated during a scan step. Hence there are $N_{multi}$ unknown capacitances, requiring at least $N_{multi}$ measurements to resolve these values. During each of these $N_{multi}$ steps, the polarity control of the Tx rows will be modulated by a set of Hadamard sequences. Once this set of $N_{multi}$ (or more) step scans is complete, the next set of $N_{multi}$ rows can be stimulated in the same fashion, as $N_{multi}$ will almost always be less than the number of actual rows in the capacitive touch panel 102.

In this way, the processing of the entire capacitive touch panel 102 occurs in blocks, where $N_{multi}$ rows of pixels are resolved during one batch of step scans, and then the next $N_{multi}$ rows of pixels are resolved in the next batch of step scans, until all the panel rows are fully resolved.

In most scenarios, the number of panel rows will not be an exact multiple of $N_{multi}$. In these situations, the number of rows scanned during the final block of rows will be less than $N_{multi}$. However, $N_{multi\ scan}$ steps may be performed on these remaining rows, using specified non-square Hadamard matrices.

Differential Scan Mode

Differential scan mode is an enhancement to normal scanning mode, whereby the frame scan operation is modified to exploit the correlation of the interference signal received across adjacent receive channels. In this mode, the normal frame scan methodology is performed; however the number of step scans used to assemble a single frame is doubled. Conceptually, each step scan in the scan sequence becomes two step scans: the first is a single-ended or normal step scan with the default values for the AFE control registers, and the second is a differential step scan.

Given $N_{RX}$ receive channels, the differential scan mode yields a total of $2N_{RX}$ receiver measurements per aggregate scan step. (e.g. $N_{RX}$ single-ended measurements and $N_{RX}$ differential measurements.) These $2N_{RX}$ measurements are recombined and collapsed into $N_{RX}$ normal measurements in the Differential Combiner block 412, 418 shown in FIG. 4.

FIGS. 5 and 6 show examples of asymmetric scan maps 500 and 600.

FIG. 7 shows a high-level architecture 700 of the analog front end. The architecture 700 includes a transmit channel 702 providing signals to columns of the capacitive touch panel 102 and a receive channel 704 sensing signals from the capacitive touch panel 102. The transmit channel 702 includes a digital to analog converter 706, polarity control circuits 708 and buffers 710. The receive channel 704 includes a pre-amplifier 712 and analog to digital converter 714.

All transmit channels may be driven by a shared transmit data signal labeled TxDAC in FIG. 7. Each physical transmit channel may also receive a common transmit digital to analog converter clock signal, labeled TxDacClk, to drive the transmit digital to analog converter 706. The clock signal will come directly from a frequency locked loop block within the TFE 132, and this clock signal will also be routed to the digital portion of the TFE 132.

Each physical transmit channel may also have its own set of channel-specific TxCtrl bits that appropriately control various parameters of the transmit channel, such as enable/disable, polarity control, and gain/phase control). These TxCtrl bits are not updated at the TxDacClk rate, but rather are updated between subsequent step scans during the frame scan operation.

A control signal controls the transmit polarity of each of the 48 transmit channels. As will be described in greater detail below, the polarity of the transmit outputs may be modulated in an orthogonal sequence, with each transmit output having a fixed polarity during each scan step during a frame scan.

All receive channels will receive a set of common clock signals. These clock signals are provided directly from a frequency locked loop block within the TFE 132, and this clock signal is also routed to the digital portion of the TFE 132. The clock signals routed to the RX channels include the signal RxADCClk which drives the RxADC. A typical clock frequency for this signal is 48 MHz.

Each physical receive channel will also have its own set of channel-specific receive control bits, labeled RxCtrl in FIG. 7, that appropriately control various parameters of the receive channel, such as enable/disable and gain control. These receive control bits are updated between subsequent step scans during the frame scan operation.

Additionally, there may be a shared set of control settings, labelled RxCtrlUniv in FIG. 7, that will control all receive channels simultaneously. These registers are primarily composed of generic control bits that will remain constant for a given implementation of the controller 104.

There are also one or more reset lines labeled RxReset that are common to all reset channels. These reset lines may be asserted in a repeatable fashion prior to each scan step.

Waveform Generation

The waveform generation block (WGB) 404 in FIG. 4 generates the transmit waveform for the TX channels 402. The WGB 404 generates a digital sine wave. Additionally, WGB 404 may generate other simple periodic waveforms; such as square waves having edges with programmable rise and fall times.

The primary output of the WGB 404 is the data input to the transmit channels 402 labelled TxDAC in FIG. 4. The WGB 404 receives as input signals a clock signal labelled TxDacClk and a signal labelled Start in FIG. 4. Upon receiving the Start signal from the scan controller 426, the WGB 404 begins producing digital waveforms for the duration of a single step scan. At the conclusion of the step scan, the WGB 404 ceases operation and waits for the next start signal from the scan controller 426.

The WGB 404 may have some amount of amplitude control, but the WGB 404 will typically be operated at maximum output amplitude. Therefore, the performance requirements listed below only need to be met at max output amplitude. All signal outputs may be in two's complement format. The WGB 404 may also provide arbitrary sine/cosine calculation capabilities for the scan data path 408 and spectrum estimation preprocessor 432.

The following table lists typical performance for the WGB 404.

| Specification | Min | Nom | Max | Comment |
|---|---|---|---|---|
| Clock rate | | 8 MHz | | Will operate at TxDacClk rate |
| Output frequency | 0 Hz | — | 2 MHz | |
| Frequency ctrl resolution | — | 15 bits | — | Desired resolution of ~61 Hz. Can be different. |
| # of output bits | — | 8 | — | |
| Output amplitude | 50% amplitude | 100% amplitude | 100% amplitude | |
| Amplitude ctrl resolution | — | 7 bits | — | Corresponds to 1% stepsize in amplitude control. |
| DC bias control | 0 | 0 | 0 | All outputs should be balanced around 0 |
| Output THD | | | −40 dBFs | Sine wave mode only |
| Rise/fall time | 1 calk cycle @ 8 MHz | — | 256 calk cycles @ 8 MHz | Square-wave mode only. Independent control of rise time vs. fall time NOT required. |

In FIG. 4, the differential combiner blocks 412, 410 provide the capability to operate in differential mode, where the receive channels 406 alternate step scans between single-ended measurements and differential measurements. The purpose of the differential combiner blocks 412, 418 is to combine the $N_{RX}$ single-ended measurements and $(N_{RX}-1)$ differential measurements into a single set of $N_{RX}$ final results for use in the heatmap assembly blocks 414, 420 that follow.

The differential combiner blocks 412, 418 are akin to a spatial filter. Let the vector, c, be an $N_{rx}$-by-1 vector of the capacitances to estimate. In differential mode, you have a vector, s, of single-ended measurements and a vector, d, of differential measurements. Hence, an estimate of c, called $c_{est}$, is sought by optimally recombining s and d. Determining the optimal recombination requires substantial computation, but simulations have shown that the following recombination scheme works to within roughly 0.5 dB of optimal performance over the expected range of operating conditions:

$$c_{est,n} = a_1 \cdot s_{n-2} + a_2 \cdot s_{n-1} + a_3 \cdot s_n + a_2 \cdot s_{n+1} + a_1 \cdot s_{n+2} + b_1 \cdot d_{n-1} + b_2 \cdot d_n - b_2 \cdot d_{n+1} - b_1 \cdot d_{n+2}$$

where the subscript n indicates result from the $n^{th}$ receiver channel, and $0 \le n \le N_{RX}-1$.

Furthermore, the coefficients are subject to the following constraints:

$$0 \le a_1, a_2, a_3 \le 1$$

$$a_3 = 1 - 2a_1 - 2a_2$$

$$b_1 = a_1$$

$$b_2 = a_1 + a_2$$

Given these constraints, it can be observed that the math operation listed above can be collapsed into two multiplication operations:

$$c_{est,n} = s_n + a_1 \cdot (s_{n-2} - 2s_n + s_{n+2} + d_{n-1} + d_n - d_{n+1} - d_{n+2}) + a_2 \cdot (s_{n-1} - 2s_n + s_{n+1} + d_n - d_{+1})$$

The equations above assume that the data exists for 2 receivers on either side of the nth receiver. (e.g. $2 \leq n \leq N_{RX}-3$) Therefore, the equations above may be modified for the two outer edge receive channels on either side. The modifications are quite simple. First, replace any non-existent $s_k$ term with the nearest neighboring $s_j$ term that does exist. Second, replace any non-existent $d_k$ term with 0. Putting these rules together and expressing the mathematics in matrix form, we get:

$$c_{est} = \begin{bmatrix} a_1+a_2+a_3 & a_2 & a_1 & 0 & 0 & -b_2 & -b_1 & 0 & 0 \\ a_1+a_2 & a_3 & a_2 & a_1 & 0 & b_2 & -b_2 & -b_1 & 0 \\ a_1 & a_2 & a_3 & a_2 & a_1 & b_1 & b_2 & -b_2 & -b_1 \\ \vdots & \vdots & \vdots & \vdots & \vdots & \vdots & \vdots & \vdots & \vdots \\ a_1 & a_2 & a_3 & a_2 & a_1 & b_1 & b_2 & -b_2 & -b_1 \\ 0 & a_1 & a_2 & a_3 & a_2+a_1 & 0 & b_1 & b_2 & -b_2 \\ 0 & 0 & a_1 & a_2 & a_3+a_2+a_1 & 0 & 0 & b_1 & b_2 \end{bmatrix} \begin{bmatrix} s_0 \\ \vdots \\ s_{N_{RX}-1} \\ d_1 \\ \vdots \\ d_{N_{RX}-1} \end{bmatrix}.$$

Lastly, while the optimal values of $\{a1, a2, a3, b1, b2\}$ are dependent upon the precise noise and interference environment, it has been found that the following values for these parameters operate near optimal performance for the expected range of operating environments:

$a_1 = 1/8$ $a_2 = 7/8$ $a_3 = 5/16$ $b_1 = 1/8 \cdot k_{ADC}$ $b_2 = 11/32 \cdot k_{ADC}$ The parameters $b_1$ and $b_2$ above are dependent upon another parameter, $k_{ADC}$. The new parameter, $k_{ADC}$, is dependent upon the value of receive channel analog to digital converter gain (Rx_AdcGain) used during the differential measurement step, as detailed in the table below:

| Rx_AdcGain<1:0> used during differential measurement step | $k_{ADC}$ |
|---|---|
| 00 | 1 |
| 01 | 3/4 |
| 10 | 1/2 |
| 11 | 3/8 |

These a and b coefficients should be programmable by a control source such as firmware that is part of the controller 104, but the default values should be those listed above. The table below indicates the suggested bit width for each coefficient:

| Coefficient | Bit width |
|---|---|
| $a_1$ | 5 |
| $a_2$ | 5 |
| $a_3$ | 5 |
| $b_1$ | 6 |
| $b_2$ | 8 |

The heatmap assembly blocks (HAB) 414, 420 take the step scan outputs from the scan data path 408 or differential combiners 412, 418, if used, and assembles the complete capacitive heatmap that is the major output of the frame scan operation. In order to do so, it may mathematically combine all of the step scan outputs in the appropriate manner to create estimates of the capacitance values of the individual capacitive pixels in the capacitive touch panel 102.

As shown in FIG. 4, there are two separate and identical instantiations of the HAB. A first HAB 414 is for the I-channel data and a second HAB 420 is for the Q-channel data. Each HAB 414, 418 operates on the either the I-channel or Q-channel data in order to create either an I-channel or a Q-channel capacitive heatmap.

In order to demonstrate the mathematics that may apply for heatmap assembly, an example 4×5 capacitive touch panel 800 is illustrated in FIG. 8. In this example, only the capacitive pixels in column 1 are analyzed, but the same principle can be easily extended to each of the five columns in the example capacitive touch panel 800. In particular, the output of receive column j is only affected by capacitance pixels in column j.

The example capacitive touch panel 800 includes a touch panel 802, a transmit digital to analog converter (TxDAC) 804, transmit buffers 806, 808, 810, 812, and a receive analog to digital converter 814. The transmit buffers 806, 808, 810, 812 each have an associated multiplier 816, 818, 820, 822, respectively. The multipliers 816, 818, 820, 822 operate to multiply the applied signal from the TxDAC by either +1 or −1.

In the example of FIG. 8, a single TxDAC waveform is sent to all four transmit buffers 806, 808, 810, 812. However, each buffer multiplies this waveform by either +1 or −1 before transmitting it onto the row of the touch panel 802. For a given step scan (indicated by the subscript "step_idx"), each value of Hi, step_idx is held constant. But for subsequent step scans in the scan sequence, these values may change. Therefore, at a given step index, the voltage received at $m^{th}$ Rx channel is:

$$V_{step\_idx,m} = V_{TX} \cdot RxGain_m \sum_{n=0}^{NumRows-1} H_{n,step\_idx} \cdot C_{n,m}$$

where $V_{TX}$ is the amplitude of the transmit signal and $RxGain_m$ is the gain of the receive channel m. In order to simplify the analysis, these two parameters are assumed to be equal to 1 and ignored in subsequent calculations.

As can be seen by this equation above, $V_{step\_idx,m}$ is based on NumRows (e.g. 4) unknown values, $C_{n,m}$, with n=0 to 3 in this example. Therefore, if four independent step scans are performed with four independent H sequences applied to the four transmit buffers 806, 808, 810, 812, the relationship between V and C can be inverted in order to estimate the C values from V. In matrix form, this can be written:

$$V_m = H \cdot C_m$$

$$V_m = \begin{bmatrix} V_{0,m} \\ V_{1,m} \\ \vdots \\ V_{NumSteps-1,m} \end{bmatrix}$$

$$H^{NumSteps,NumRows} = \begin{bmatrix} H_{0,0} & \cdots & H_{0,NumRows-1} \\ \vdots & \ddots & \vdots \\ H_{NumSteps-1,0} & \cdots & H_{NumSteps-1,NumRows-1} \end{bmatrix}$$

$$C_m = \begin{bmatrix} C_{0,m} \\ C_{1,m} \\ \vdots \\ C_{NumRows-1,m} \end{bmatrix}$$

In this formulation, the column vector $C_m$ represents the capacitance of the capacitive pixels in the $m^{th}$ column of the capacitive touch panel. H is a NumSteps×NumRows matrix, where the $n^{th}$ column of the H-matrix represents the multiplicative sequence applied to the $n^{th}$ transmit row. The optional superscript of H indicates the dimensions of the H matrix. $V_m$ is a column vector, where the $n^{th}$ entry in the matrix is the $n^{th}$ step scan output of $m^{th}$ RX channel.

In the present application, H is a special form of matrix, called a modified Hadamard matrix. These matrices have the property that:

$$H^T \cdot H = NumSteps \cdot I$$

where I is the NumRows×NumRows identity matrix, and $H^T$ is the transpose of H.

Given the formulation above, and the properties of the H-matrix, the relationship from $C_m$ to $V_m$ can be inverted in order to extract out the values of the $C_m$ vector from the $V_m$ measurements. Using the terminology defined above:

$$C_m = \frac{1}{NumSteps} H^T \cdot V_m$$

In the example above, the panel had four rows and the value of NumSteps (equivalently $N_{multi}$) was also set to four. Therefore, all panel rows were stimulated during every step scan. In general, the number of panel rows will be larger than the value of $N_{multi}$. In that case, the panel stimulation is broken up into blocks. During each block of $N_{multi}$ step scans, $N_{multi}$ adjacent rows are stimulated with the Hadamard polarity sequencing described above.

The heatmap assembly block 414, 420 works on each block of $N_{multi}$ scans independently in order to create the complete heatmap output. For instance, if there were twelve panel rows and $N_{multi}$ were set to four, then the first four step scans would be used to stimulate and assemble the first four rows of the capacitive heatmap; the next four step scans would be for the fifth through eighth panel rows; and the last four step scans would be for the ninth through twelfth rows. Therefore, for each block of $N_{multi}$ rows, the heatmap assembly block operates in the exact same manner as defined above. However, the outputs of the HAB 414, 420 are mapped to the subsequent rows in the complete capacitive heatmap.

The heatmap assembly block 414, 420 is capable of assembling a 32-column-wide heatmap, as there are a total of 32 receiver channels implemented in one embodiment. However, in many cases, the capacitive touch panel used will not have 32 columns, and hence not all 32 receive channels are used.

Mathematical Extensions for Asymmetric Panel Scanning

As described above, the controller 104 preferably has the capability to perform asymmetric panel scans, where the firmware supporting operation of the controller 104 has the capability to define the number of times each row is to be scanned. Given the formulation for asymmetric panel scanning outlined above, the changes to the heatmap assembly operation in order to support this feature are minimal.

As described above, the heatmap is assembled in blocks of $N_{multi}$ rows. In asymmetric scanning, $N_{multi}$ can vary on a block-by-block basis. Therefore, the old equation of:

$$C_m = \frac{1}{NumSteps} H^T \cdot V_m$$

is still valid. However, with asymmetric scanning, the dimensions of C, V, and H and the value of NumSteps change on a block-by-block basis.

The I/Q combiner 422 shown in 4 is used to combine the I- and Q-channel heatmaps into a single heatmap. The primary output of the I/Q combiner 422 is a heatmap of the magnitude (e.g. Sqrt[$I^2+Q^2$]). This is the heatmap that is handed off to the touch back end 134.

The row/column normalizer 424 shown in FIG. 4 is used to calibrate out any row-dependent or column-dependent variation in the panel response. The row/column normalizer 424 has two static control input vectors, identified as RowFac and ColFac. RowFac is an Nrow-by-1 vector, where each entry is 1.4 unsigned number (e.g. LSB=1/16. Range is 0 to 31/16). ColFac is an Ncol-by-1 vector, where each entry has the same dimensions as RowFac.

If the input data to the Row/Column Normalizer block is labeled as Heatmapin(m,n), where m is the row index and n is the column index, the output of the block should be:

HeatmapOut(m,n)=HeatmapIn(m,n)·RowFac(m)·ColFac(n)

In one embodiment, the controller 104 has the capability to allow RowFac and ColFac to be defined either by OTP bits or by a firmware configuration file. The OTP settings will be used if the manufacturing flow allows for per-module calibration, thus enabling the capability to tune the controller 104 on a panel-by-panel basis. If RowFac and ColFac can only be tuned on a per-platform basis, then the settings from a firmware configuration file will be used instead.

Spectrum Estimation

The spectrum estimation preprocessor 432 operates to determine the background levels of interference that couple into the receive channels 406 so that the controller 104 may appropriately select transmit frequencies that are relatively quiet or interference free.

The spectrum estimation preprocessor 432 will generally only be used during SEM mode, so it is not part of the standard panel-scan methodology. Instead, the spectrum estimation preprocessor 432 will be used when conditions indicate that SEM should be invoked. At other times, the spectrum estimation preprocessor 432 can be powered down.

Baseline Tracking and Removal Filter

A touch event should be reported by the controller circuit 104 when the measured capacitance of a capacitive pixel (or group of pixels) changes by a sufficiently large amount in a sufficiently short period of time. A baseline capacitance value is used to extract touch heatmap data to identify a touch of the capacitive touch panel. Current raw data is compared with the baseline or no-touch data, for example by subtracting the baseline capacitance value from the current raw data. If a significant change is detected, a touch event may have occurred. The controller circuit 104 accordingly maintains a baseline capacitance value However, the baseline capacitance measurement is subject to variations that must be accommodated. First, baseline capacitance can be affected by sudden ambient capacitance changes due to random events, such as a water drop, a dirt particle or even a false touch on the surface of the capacitive touch panel. A conventional touch is detected by the controller circuit 104 as a decrease in capacitance. A water droplet or a piece of floating metal such as a coin, or other contaminant on the surface of the capacitive touch panel 102 will cause the capacitance detected by the controller circuit 104 at the pixels where the water droplet is present to be increased. Thus, a contaminant such as a water droplet will appear to the controller circuit 104 as an anti-touch event. Subsequently, when the water droplet is removed from the touch panel, this could be incorrectly detected as a touch, therefore causing inaccurate behavior of the device which incorporates the capacitive touch panel.

Second, baseline capacitance can be affected due to slow environmental shifts in temperature, humidity or other causes of drift. The absolute or baseline capacitance of a pixel (or group of pixels) can change substantially at slow rate relative to capacitance changes due to a touch event. These baseline changes can cause severe touch performance degradation if not accommodated.

Relatedly, if a conductive object is in contact with the touch screen surface when the controller circuit 104 becomes active, the baseline determination can be corrupted. This can occur, for example, if the portable device 100 (FIG. 1) is in a user's pocket, with the capacitive touch panel 102 touching a body part of the user such as the user's thigh. When the portable device 100 becomes active, such as when it receives an incoming call, the portable device activates the LCD 112 and the controller circuit 104 must recalibrate baseline. Due to the thigh touching the capacitive touch panel 102 during recalibration, the baseline measurement is corrupted. Any subsequent touch may not be detected and recognized or correctly identified. The result may be dead or nonresponsive pixels on the touch screen.

Most generally, in conventional applications, it is difficult to anticipate use scenarios and conditions. A condition of water or other contaminants may be mixed with a false baseline calibration and these may occur unpredictably. Thus, the baseline is subject to being corrupted by either contaminants or an unintentional touch or both, without regard to timing or operational circumstance. Accordingly, a self-recovery mechanism is required to ensure robustness of the touch controller circuit 104 while maintaining high touch accuracy and performance.

In order to discriminate changes in pixel capacitance due to a touch event from changes due to environmental drift, a baseline tracking filter can be implemented in the controller circuit 104 to track the changes in the baseline capacitance. The baseline capacitance or baseline may be considered as the. untouched or ambient value of the capacitance of a pixel, group of pixels or an entire capacitive touch panel. Simple subtraction of the baseline capacitance from the input capacitance will yield the change in capacitance due to the touch event. Generally, the touch event will result in a lower detected capacitance, reported as a lower value by the analog to digital converter such as the receive channel analog to digital converter 814 in FIG. 8.

As will be described herein, the present disclosure provides an improved system and method for tracking baseline over time and varying conditions. Operations used to calculate and track the proper baseline are dependent upon the values of the data received by the baseline tracking filter. In other words, the filter coefficients used in the baseline tracking filter dynamically change based on the nature of the incoming data. Different filter coefficients must be used to respond to slow-moving changes such as baseline drift over time versus rapid changes such as due to a touch event or due to water or contaminant on the touch surface. A finite state machine is used to perform an initial assessment on the data and reconfigure the baseline tracking filter accordingly.

To improve the handling of water and other contaminants present on the touch surface, two different baseline tracking modes are defined. The first mode is a dry baseline (DB) mode. The second is a wet baseline (WB) mode. When the system and method determine that no water or other contaminant is present, the baseline tracking filter operates in DB mode and tracks the baseline appropriately. When a water droplet or other contaminant is detected, the baseline tracking filter stores the DB mode baseline data in memory and transitions to WB mode. The operations used in WB mode are fundamentally different from those used in DB mode, since the present of the water droplet affects the response of the capacitive touch panel. Meanwhile, the DB mode baseline data, stored in memory, is used to determine when the water droplet has been removed from the touch surface, either by being wiped away or evaporating. Once it is detected that the droplet has been removed, the system transitions back to DB mode and the DB mode baseline gets recalibrated by using simple averaging over a few (M) frames.

Further, the system operates differently for a fixed period of time following system power-up or other anomalous events than it does during normal operation. This provides fast self-recovery from the situation where a conductive object is in contact with the touch screen surface when the system becomes active. After system power-up and other specified events, the system may be considered to have less confidence in the accuracy of the baseline capacitance value. Therefore, if anomalous behavior is observed, the system is quick to force a hard recalibration of baseline. However, after the system has been behaving normally for a suitable length of time, the system has higher confidence in the accuracy of the baseline value. A timer, Timer0, is maintained to time the duration of this start-up period. An exemplary value for Timer0 is 10 seconds but any suitable value may be used. Thus, the system behavior changes so that the system interprets received data as the result of a water droplet rather than the result of a corrupted baseline value.

Also, a spatial checking algorithm is included which is based on the spatial characteristics analysis between true dry baseline and touch-corrupted dry baseline. The true dry baseline is a snapshot of the system baseline at the time of manufacture, for example, of the device which incorporates the capacitive touch panel and the controller circuit. The true dry baseline value can be stored on the controller circuit or elsewhere in persistent or non-volatile memory for subsequent use as a dry baseline reference. In the event of a suspicious dry baseline calibration, such as one that is inconsistent with previous values or is internally inconsistent, a spatial check can be performed against the stored true dry baseline value to confirm whether the current dry baseline value is valid or corrupted.

FIG. 9 illustrates one embodiment of a baseline tracking filter 900. The filter 900 includes a low-pass filter (LPF) 902, a decimator 904 and a combiner 906. The input signal to the filter 900 is raw capacitance sample values from the analog to digital converter at the receiver analog front end. In some implementations, the system may perform its analysis not on raw capacitance values, but on delta capacitance: the difference between capacitance when the touchscreen is not touched, and the current reading. The current reading (the raw capacitance) decreases in the presence of a touch. The input signal to the filter 900 is provided to the combiner 906 and the decimator 904. The output signal of the decimator is provided to the input of the LPF 902. The output of the LPF 902 is combined with the input signal at the combiner 906. The LPF 902 has an enable input for controlling operation of the filter 900.

The LPF 902 in the baseline tracking filter 900 is used to improve the estimate of the baseline capacitance value. One embodiment uses a simple finite impulse response (FIR) moving average filter of length N (also known as a comb filter), such as:

$$H_N(z) = \frac{1}{N} \cdot \frac{1-z^{-N}}{1-z^{-1}} = \frac{1}{N} \cdot \sum_{n=0}^{N-1} z^{-n}$$

Another embodiment uses a 1-tap infinite impulse response (IIR) filter, also referred to as a modified moving average, with response:

$$H_k(z) = \frac{\frac{1}{k}}{1-\left(1-\frac{1}{k}\right)z^{-1}}$$

The FIR embodiment of the filter 902 may be used upon startup and recalibration of the baseline value, as it can quickly acquire and track the baseline value. The IIR embodiment of the filter 902 should be used once the initial baseline value is acquired, as it can be a very computationally efficient means to implement a low-pass filter, particularly if k is chosen to be a power of 2. By increasing the value of k, one can set change the signal bandwidth of the filter to arbitrarily small values with minimal increase in computational complexity.

Filter 900 has two outputs, labeled Out and Baseline in FIG. 9. The Baseline output is the estimate of the current baseline (e.g., the ambient or untouched) capacitance of the particular panel pixel or pixels being scanned, and the Out output is the baseline-corrected value of that capacitance measurement. The Out value is what should be used in the subsequent touch-detection logic.

The LPF 902 in FIG. 9 has an input labeled Enable to receive an enable signal in order to shut down the LPF 902 when a potential touch event is detected. This is provided so that the Baseline output is not corrupted by spurious data, most likely from a touch event. If the enable signal at the Enable input is low, the LPF 902 will hold its previous output without updating its output with the incoming data, effectively ignoring the incoming data. Once the enable signal is high, the LPF 902 will continue to update its output with the incoming data. Logic for generating the enable signal is detailed in the following equation:

Enable=(Out≤PosLPFThresh)&&
(Out≥NegLPFThresh)

where PosLPFThresh and NegLPFThresh are configurable parameters.

In a mutual-capacitance scan mode, where a touch event causes a reduction in the input data, the NegLPFThresh should be set to $k_T$*TouchThresh, where $0<k_T<1$ and TouchThresh is the touch-detection threshold defined below. These may both be programmable parameters.

Programmable Update Rate

The timescale of most baseline drift phenomena will be far slower than the frame rate of the touch panel scan. For instance, observed baseline drift devices had timescales on the order of 1 hour or longer, whereas the frame rate of a current device may be on the order of 200 frames/second. Therefore, in order to reduce the computation required for baseline tracking, the controller circuit 104 shall have the capability to scale the update rate of the baseline tracking filter 900. The device may do this by using the decimator 904 to decimate the data fed to the filter 900, so that the filter 900 only operates on every N_BTF_decimate frames of heatmap data, where N_BTF_decimate is a programmable parameter. Therefore, the Baseline data in FIG. 9 will update at this slower rate. However, the baseline corrected output data, labeled Out in FIG. 9, must be calculated for every frame.

The baseline tracking operation needs to exercise special care when spectrum estimation mode (SEM) is invoked. SEM may cause a configuration change in the analog front end which in turn will alter the gain in the transfer function (e.g. from capacitance values to codes) of the touch front end. This, in turn, may cause abrupt changes in the capacitive heatmap to occur that could be accidentally interpreted as touch or anti-touch events.

A touch event is detected when the baseline-corrected output exhibits a significant negative shift. The shift in this output may be larger than a programmable parameter, called TouchThresh. Furthermore, since the controller circuit 104 may scan a panel at upwards of 200 Hz and a human finger or metal stylus moves at a much slower timescale, a programmable amount of debounce, dubbed TouchDebounce, should also be included. Therefore, before a touch is recognized, the output of the baseline filter may be more negative than TouchThresh for at least TouchDebounce frames. It is likely that TouchDebounce will be a small value, in order that the total touch response time is faster than 10 ms.

FIG. 10 is a plot 1000 of detected capacitance value for different operating conditions of a capacitive touch panel. The plot 1000 illustrates four operating regions. A baseline value for touch screen capacitance $C_b$ is established. The detected capacitance values are variations from the value $C_b$.

A first region 1002 may be termed the baseline wandering zone. When the touch panel is operating in the first region 1002, the capacitance detected by the controller circuit 104 is approximately consistent with previous baseline measurement $C_b$. As indicated, the measured baseline value may vary slowly over time and this baseline variation is tracked and smoothed out but considered normal.

The first region 1002 has an upper limit or positive threshold designated TH_p. A second region 1004 is defined for capacitance measurements exceeding TH_p. When the controller circuit 104 detects a capacitance value exceeding TH_p, the event may be considered a potential touch of the capacitive touch panel.

The second region 1004 has an upper limit designated TH_t in FIG. 10. A third region 1006 is defined for capacitance values that exceed the touch threshold TH_t.

The first region 1002 on FIG. 10 is bounded by the second region 1004 and a fourth region 1008. The fourth region 1008 may correspond to an anti-touch measurement of touch panel capacitance. When the measured capacitance falls below a threshold TH_n_o, the controller circuit 104 may determine that an anti-touch event has occurred. As will be described in greater detail below, in one embodiment a hysteresis analysis is used. As part of the analysis, an additional threshold TH_n_i, the negative threshold for entering wet baseline mode, is defined. The threshold TH_n_o may be termed the negative threshold for existing wet baseline mode, along with the relation TH_n_o>TH_n_i. When the detected capacitance exceeds a threshold value, processing switches to a wet baseline mode of operation.

FIGS. 11-14 are a flow chart illustrating operation of the baseline tracking operation for use in a controller circuit for a portable device. The method begins at block 1100. The method may begin at power up or reset of the controller circuit 104. At block 1102, two variables are initialized. Logical variable HD has two values. It is set to a value of 0 to indicate a dry baseline soft decision and set to 1 to indicate a dry baseline hard decision. The logical variable BL_flag is set to 0 to indicate dry baseline mode and set to 1 to indicate wet baseline mode. At block 1104, a timer is started.

The timer, Timer0, may be used to set a maximum time between recalibration of baseline by the controller circuit 104. Timer0 may also be used to time the duration of a temporal processing period following an initialization of the controller circuit. Initialization may occur at power up or when the touch panel is energized or re-energized after being de-energized. For example, if a cellular phone including the touch panel and touch panel controller is in a user's pocket when an incoming call is receive, the touch panel is energized and the touch controller must re-calibrate baseline. Due to contact with the touch panel at this time, the baseline data may be corrupted. In accordance with one embodiment, the timer Timer0 times the temporal processing period. During this period, the baseline tracking filter acts differently for a fixed period of time following system power-up or other initialization events than it does during normal operation. After a system initialization event, the system has less confidence in the accuracy of the baseline data. Therefore, if anomalous behavior is observed, the system is quick to force a hard recalibration of baseline data. However, after the system has been behaving "normally" for a suitable length of time timed by Timer0, there is higher confidence in the accuracy of the baseline data. Thus, the system behavior changes so that it interprets the data as the appearance of a water droplet or other contaminant rather than the result of a corrupted baseline.

At block 1106, the change in capacitance is calculated as the difference between the current input capacitance Ci and the current baseline value. The current input capacitance may be received as raw data from the receiver front end analog to digital converter. The current baseline value may be retrieved from storage. At block 1108, it is determined if the variable SE_change has a value of 1, indicating spectrum estimation mode. If yes, the baseline tracking algorithm is bypassed and control returns to block 1106.

Figure 12:
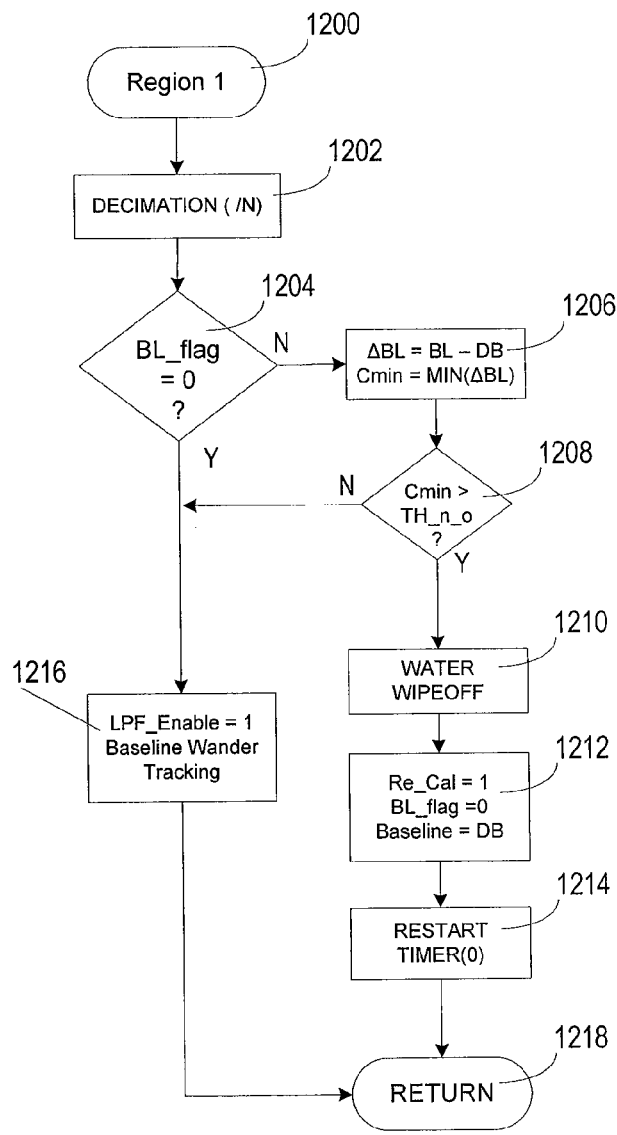

At block 1110, maximum capacitance value $C_{max}$ and a minimum capacitance value Cmin are determined from the calculated value ΔC for the change in capacitance. Based on the values of Cmax and Cmin, it is determined if region 1 applies. This determination may be made using the relations $Cmax<TH\_p$ and $Cmin>Th\_n\_i,$ where the thresholds are defined as shown in FIG. 10. Region 1 corresponds to a baseline wandering condition, with no touch condition present. In this condition, the IIR slow tracking filter should be used with large value of k and the low pass filter enabled, i.e., LPF_enable set to a value of 1. If both relations are true, region 1 applies and control proceeds to block 1114 as shown in FIG. 12.

Before beginning region 1 processing, it is first determined if recalibration is required. The logical variable Re_cal may have been set during previous processing. This value is tested at block 1114. If Re_Cal is not set, control proceeds to block 1116 for region 1 processing, shown in FIG. 15. If Re_Cal is set, at block 1122 it is determined if the number of processed frames m is less than a maximum value M. Setting the value M and testing the value m allows the desired recalibration frame number to be configured. If the relation m<M is false, at block 1120, recalibration is indicated as being done, the variable Re_Cal is cleared to a zero value and the variable LPF_enable is set to 1. Control is returned to block 1106.

If, at block 1122, the value of m was less than M, at block 1124 the value of m is incremented. at block 1126, a new baseline value BL_new is calculated and at block 1128, the baseline value is set to the newly calculated baseline value. Control returns as above.

If, at block 1112, it was not determined that region 1 processing should apply, at block 1130 it is determined if region 2 or 3 processing should apply. This is done using the following relation:

$Cmax>=TH\_p$

Depending upon which baseline mode currently is in effect (determined by checking the baseline flag variable BL_Flag), either region 2 or region 3 processing should apply. If in dry baseline mode (BL_flag=0), region 2 processing will apply if the following condition is true.

$TH\_p<=Cmax<TH\_t$

Otherwise, region 3 processing will apply in dry baseline condition. If in wet base line mode (BL_flag=1), only region 3 processing will apply in wet baseline condition.

For region 3 processing, a touch debounce process is performed and if a true touch event is detected, processing of the IIR filter is halted until it is determined that the touch event has ended.

If, at block 1130, region 2 or 3 processing does not apply, at block 1134 it is determined if region 4 processing applies. Region 4 processing will apply if the following relations are true.

$Cmax<TH\_p,$ and $Cmin<=TH\_n\_i$ as shown in FIG. 10. Region 4 processing corresponds to an abnormal event. A more negative capacitance change would indicate a substantial environmental change, spurious noise or other non-touch abnormal cases. In the illustrated embodiment, a timer labeled t4 herein is used for abnormal touch event debounce. A valid abnormal touch event has to be persistent for a sufficiently long duration. If the timer t4 exceeds a threshold, the IIR filter is disabled and a fast recalibration is initiated and new wet baseline data is obtained. If both these relations are true and region 4 processing applies, control proceeds to block 1136, shown in FIG. 14. Otherwise, control returns as described above.

FIG. 12 shows region 1 processing, beginning at block 1200. At block 1202, input data may be decimated prior to filtering. As noted, it has been observed that baseline drift devices have timescales on the order of 1 hour or longer, whereas the frame rate of a current device may be on the order of 200 frames/second. To reduce the computation required for baseline tracking, the update rate of the baseline tracking filter is scaled, for example using a decimator to decimate the data fed to the filter.

At block 1204, it is determined if the baseline flag BL_flag is reset to a zero value indicating DB mode. If so, control proceeds to block 1216, the low pass filter is enabled and baseline wander tracking begins. At block 1218, control returns, for example to block 1106 in FIG. 11.

If at block 1204, it is determined the baseline flag BL_flag is not reset to a zero value indicating wet baseline mode, at block 1206 the illustrated calculations are performed. At block 1208, the calculated value of Cmin is tested against the threshold TH_n_o. If Cmin does not exceed this threshold control proceeds to block 1216 for conventional processing of the baseline wander tracking condition in WB mode. On the other hand, if Cmin does exceed the threshold, at block 1210 a wipe off of water or other contaminant from the touch panel is determined. At block 1212, the recalibrate flag Re_Cal is set, the baseline flag BL_flag is reset and baseline is set to DB data. At block 1214, Timer0 is restarted and control returns at block 1218.

Figure 13:
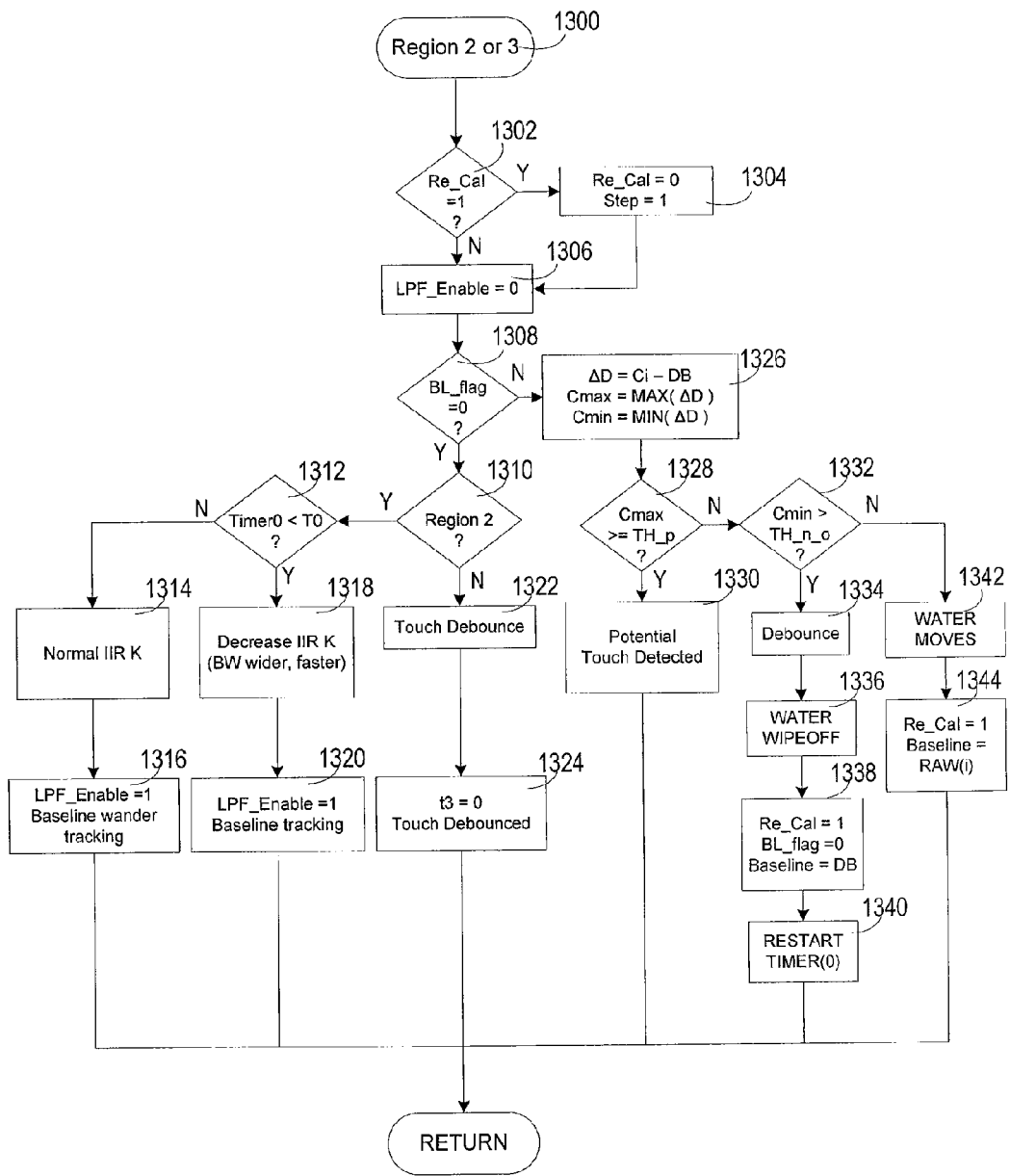

FIG. 13 shows region 2 and 3 processing, beginning at block 1300. At block 1302, it is determined if the recalibrate flag Re_Cal is set to 1. If so, at block 1304, Re_Cal is reset to 0. At block 1306, the low-pass filter is disabled as LPF_Enable is reset to 0.

At block 1308, it is determined if the baseline flag BL_flag is reset to zero. If so, at block 1310 it is determined if region 2 processing applies by comparing TH_p<=Cmax<Th_t. If this is true, at block 1312, the value of Timer0 is compared with value T0. If the timer exceeds T0, at block 1314 the IIR filter is set to use its conventional value for K and at block 1316, the value LPF_Enable is set to 1 to enable baseline wander tracking. If the timer Timer0 is less than T0 at block 1312, then at block 1318, the k value of the IIR filter is decreased so that the IIR filter bandwidth becomes wider and filters faster. Any suitable value may be used for the duration of Timer0, such as 10 seconds. At block 1320, the low-pass filter is enabled and baseline tracking begins.

If, at block 1310, it was determined that region 2 processing does not apply, then region 3 processing must apply and a touch must have occurred. At block 1322 a touch debounce process is performed and at block 1324 a timer t3 is zeroed.

At block 1308, if the BL_flag was no reset, control proceeds to block 1326. A new capacitance value ΔD is determined by subtracting dry baseline data from the input capacitance value Ci. A new value of Cmax is set as the maximum value of ΔD and a new value of Cmin is set as the minimum value of ΔD. ΔC or ΔD may form the heatmap output.

At block 1328, the new value of $C_{max}$ is compared with TH_p. If $C_{max}$ exceeds this value, a potential touch is detected, block 1330. Otherwise, at block 1332, the value Cmin is compared with TH_n_o. If Cmin is less than or equal to this threshold, at block 1334 a debounce process is performed and at block 1336 it is determined that water or other contaminant that was on the surface of the touch panel has been wiped off, evaporated or otherwise removed. At block 1338, in response, the recalibration flag is set to one, the baseline flag is set to 0 and the baseline value is set to the dry baseline value.

Otherwise, if at block 1332, the value of Cmin does not exceed the threshold, at block 1342 it is determined that water droplets have moved to a different pixel location on the touch panel. At block 1344, the value of Re_Cal is set to 1 and the baseline is set to the raw input data from the analog to digital converter. After region 2 or 3, processing, control returns as above.

Figure 14:
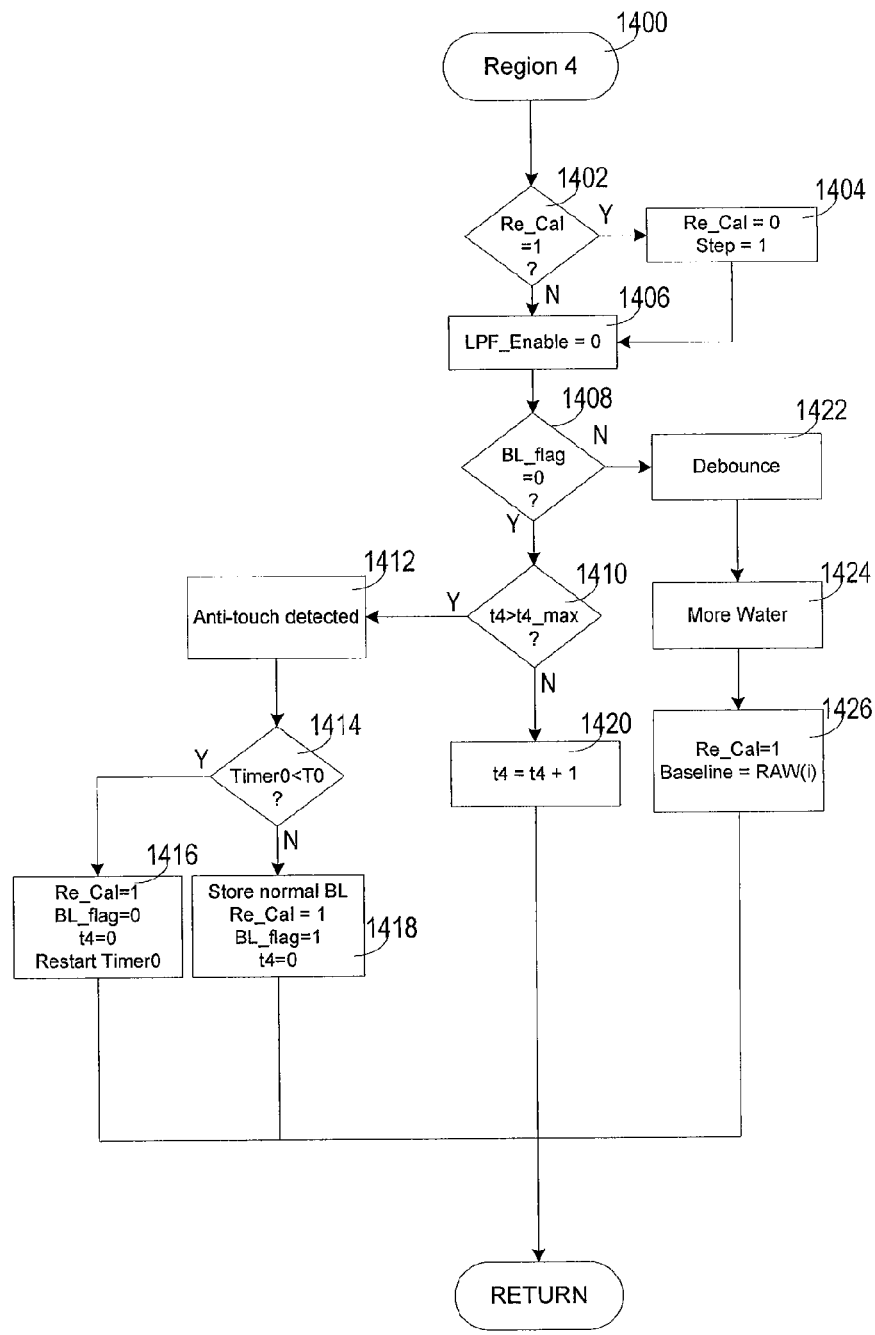

FIG. 14 illustrates processing according to region 4, as shown in FIG. 10. Region 4 corresponds to an anti-touch or otherwise abnormal event. The method begins at block 1400. At block 1402, it is determined if the recalibration flag is set. If so, at block 1404, the recalibration flag is reset. At block 1406, the low-pass filter is disabled.

At block 1408, it is determined if the baseline flag is reset to a zero value. If so, at block 1410, the timer value t4 is tested against its maximum value, t4_max. If the maximum value is not exceeded, the timer t4 is incremented at block 1420. Otherwise, if the timer t4 has been active more than the maximum value, an anti-touch or other abnormal condition has been detected, block 1412. At block 1414, the timer Timer0 is compared with value T0. If less than T0, at block 1416, the recalibration flag Re_Cal is set to 1, the baseline flag is reset to zero, timer t4 is reset to 0 and the Timer0 is restarted. Otherwise, if Timer0 is greater than T0, at block 1418, the normal baseline value is stored, the recalibration flag is set to 1, the baseline flag is set to 1 and t4 is set to 0.

If at block 1408, the baseline flag was reset to 0, at block 1422 a debounce process is performed. At block 1424, a condition of more water present on the touch panel is determined and at block 1426, the recalibration flag is set to 1 and the baseline value is set to the raw input capacitance data.

Heatmap Noise Estimation

The touch back end 134 requires an estimate of the noise level in the capacitive touch panel 102 in order to properly threshold the touch blobs during the detection process. The noise level can be detected by observing noise at the output of the baseline tracking filter as shown in FIG. 15. FIG. 15 shows a first variance estimator 1500 in conjunction with the baseline tracking filter 900 of FIG. 9. In FIG. 15, the baseline tracking filter 900 has its Out output coupled to an input of the variance estimator 1500. The variance estimator 1500 includes a decimator 1502, a signal squarer 1504 and a low-pass filter 1506. The variance estimator 1500 in this embodiment is simply a mean-square estimator, as the output of the baseline tracking filter 900 is zero-mean. Hence the mean-square is equal to the variance.

In order to lower the computational requirements for the variance estimator 900, the data entering the variance estimator can be decimated in the decimator 1502 by the factor, N_VAR_decimate. The low-pass filter 1506 in the variance estimator 1500 may either be a comb-filter or a modified-moving-average filter. The length of the response of the filter 1506 may be a programmable parameter, averaging data over as many as 100 or more frames. In order to lower memory requirements, the MMA filter may be preferred.

As with the baseline tracking filter 900, the LPF 1506 in the variance estimator 1500 has an input for an enable signal. The enable signal is low when the pixel in question is being touched. Otherwise, the variance estimate will be corrupted by the touch signal. When the enable signal is low, the LPF 1506 should retain state, effectively ignoring the data coming into the variance estimator 1500.

The output of the variance estimator 1500 is the variance of one single pixel in the capacitive touch panel 102. Therefore, this provides an independent variance estimate of each pixel in the panel. To get an estimate of the variance across the panel 102, the controller circuit 104 may average the per-pixel variances across the entire frame.

Alternately, if only a single per-frame variance estimate is needed, the controller circuit 104 can follow the approach shown in FIG. 16. FIG. 16 shows a second variance estimator 1600 in conjunction with the baseline tracking filter 900 of FIG. 9. In FIG. 16, all the per-pixel baseline tracking filters are grouped as baseline tracking filters 900, on the left in the figure. All the baseline-corrected outputs from the baseline tracking filters 900 are passed to the variance estimator 1600.

Like the variance estimator 1500 of FIG. 15, the variance estimator 1600 includes a decimator 1602, a signal squarer 1608, a summer 1604 and a low-pass filter 1606. The variance estimator 1600 combines the outputs of the baseline tracking filters 900 into a single value by summing the baseline-corrected outputs across the entire frame in the summer 1604. This averaged value is then passed to the same square-and-filter estimator that was described above, formed by the signal squarer 1608 and the low-pass filter 1606. Assuming that the noise is uncorrelated from pixel-to-pixel, the output of the variance estimator 1600 is equal to the sum of all the pixel variances reported by the block diagram in FIG. 4. In order to generate the average pixel variance across the panel, this result may be divided by the total number of pixels in the capacitive touch panel 102. To generate an estimate of the standard-deviation of the noise, the controller circuitry 104 may take the square root of the variance.

From the foregoing, it can be seen that the present invention provides improved baseline capacitance tracking for capacitive touch devices. A baseline tracking filter uses filter coefficients tailored to the nature of received data. Two separate baseline tracking modes are defined, a dry baseline mode and a wet baseline mode. The dry baseline mode is used when no water or other contaminant is detected. However, when water or other contaminant is detected, operation instead uses the wet baseline mode until presence of the water or other contaminant is no longer detected. Upon start-up or recovery, the system monitors validity of the baseline data values and initiates a hard recalibration of baseline if anomalous behavior is detected. These features allow reliable operation of the capacitive touch panel in a variety of conditions, including where moisture and other contaminants predominate, and compensate for baseline wandering and slow shifting due to slow environmental changes in temperature, humidity and other conditions. The result is a much more reliable device and improved user experience.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for a touch panel control circuit, the method comprising:
   stimulating a touch panel;
   receiving signals from the touch panel responsive to the stimulating;
   based on the received signals, determining a contaminant to be present on the touch panel, including
      comparing a minimum capacitance value for the touch panel with a threshold value, and
      if the minimum capacitance value exceeds the threshold value,
      determining the contaminant is present; and
   switching to a wet baseline mode of operation while the contaminant is present on the touch panel.

2. The method of claim 1 further comprising:
   filtering the received signals;
   based on the received signals, determining a touch event has occurred on the touch panel by
      using the received signals to determine pixel capacitance levels for pixels of the touch panel,
      subtracting baseline capacitance levels from the pixel capacitance levels to determine detected capacitance levels, and
      using the determined detected capacitance levels to determine that the touch event has occurred;
   suspending the filtering of the received signal; and
   processing the determined touch event.

3. The method of claim 2 wherein filtering the received signals comprises:
   filtering the received signals in a relatively slow tracking filter.

4. The method of claim 2 further comprising:
   establishing dry baseline capacitance levels for the touch panel;
   based on the received signals, determining pixel capacitance levels for pixels of the touch panel;
   in a dry baseline mode of operation, subtracting the dry baseline capacitance level from respective pixel capacitance levels to determine detected capacitance levels;
   in the wet baseline mode of operation, subtracting wet baseline capacitance levels from the respective capacitance levels to determine the detected capacitance levels; and
   determining the touch event has occurred based on the determined detected capacitance values.

5. The method of claim 1 wherein switching to a wet baseline mode of operation comprises:
   filtering the received signals in a relatively slow tracking filter;
   based on the received signals, determining an anti-touch event has occurred on the touch panel, including
      detecting capacitance changes of a first polarity due to touch events on the touch panel,
      detecting a capacitance change having a second polarity different from the first polarity, and
      based on the capacitance change having a second polarity, determining the anti-touch even has occurred;
   suspending the filtering of the received signal;
   recalibrating wet baseline capacitance data for the touch panel; and
   selecting wet baseline capacitance data for determining detected capacitance levels for pixels of the touch pad.

6. The method of claim 5 wherein recalibrating wet baseline data comprises measuring capacitance for the touch panel when no touch event occurs.

7. The method of claim 1 wherein determining a contaminant is present comprises:
   after determining the contaminant is present, measuring a time period during which the minimum capacitance value exceeds the predetermined threshold value; and
   when the time period exceeds a predetermined time threshold, recalibrating by determining new baseline capacitance data for the touch panel.

8. The method of claim 1 further comprising:
   in response to the received signals, detecting an anomalous condition on the touch panel when a detected capacitance level change exceeds a maximum negative capacitance change threshold;
   during a temporal processing period following an initialization of the touch panel control circuit, determining the anomalous condition corresponds to a corrupted baseline data;
   recalibrating the baseline data;
   following expiration of the temporal processing period, determining the anomalous condition corresponds to a contaminant present on the touch panel.

9. A controller circuit for a touch panel, the controller circuit comprising:
   a baseline tracking filter having an input configured to receive raw signals from the touch panel upon electrical stimulation of the touch panel and a baseline output operative to provide baseline capacitance data for the touch panel;
   a combiner having a first input coupled to the input to receive the raw signals and having a second input to receive the baseline output, and an output operative to provide capacitance heatmap data for the touch panel; and
   a controller operatively coupled to the baseline filter to select one of a dry baseline mode and a wet baseline mode of operation based on the capacitance heat map data for the touch panel, the controller varying the bandwidth of the filter based on the mode of operation.

10. The controller circuit of claim 9 further comprising:
   a data store to store dry baseline data upon selection of the wet baseline mode of operation, for subsequent retrieval upon selection of the dry baseline mode.

11. The controller circuit of claim 9 wherein the controller is configured to vary response of the filter based on rate of baseline capacitance variation detected for the touch panel.

12. The controller circuit of claim 11 wherein the controller is configured to disable the filter upon selection of the wet baseline mode of operation.

13. A method for a touch panel control circuit, the method comprising:
   stimulating the touch panel with electrical signals;
   detecting raw capacitance data for the touch panel in response to the stimulating;
   subtracting a baseline level from the raw capacitance level to produce touch heat map data for the touch panel, including:
      subtracting a dry baseline level to produce the touch heat map data, and
      subtracting a wet baseline level to produce the touch heat map data when the raw capacitance data indicates an abnormal condition exists on the touch panel.

14. The method of claim 13 further comprising:
   comparing the raw capacitance data to a touch threshold;
   when the raw capacitance data exceeds the touch threshold for a predetermined time period, determining a touch event has occurred; and
   subtracting the dry baseline level from the raw capacitance data to process the touch event for the touch panel.

15. The method of claim 13 further comprising:
   comparing the raw capacitance data to an abnormal touch threshold;
   when the raw capacitance data exceeds the abnormal touch threshold for a predetermined time period, determining an anti-touch event has occurred; and
   subtracting the wet baseline level from the raw capacitance data to process the touch event.

16. The method of claim 15 further comprising:
   upon detecting the anti-touch event, storing the dry baseline level;
   using the wet baseline level to produce the touch heat map data for the touch panel while the anti-touch event continues; and
   retrieving the stored dry baseline level when the anti-touch even no longer exists.

17. The method of claim 13 further comprising:
   filtering the raw capacitance data in a low pass filter to produce a current baseline level.

18. The method of claim 17 further comprising:
   reducing an update rate of filtering when no touch event and no abnormal condition exists on the touch panel; and
   wherein reducing the update rate of filtering comprises decimating the raw capacitance data before filtering the raw capacitance data.

19. The method of claim 13 further comprising:
   performing a baseline level recalibration procedure;
   retrieving stored true baseline data; and
   performing a spatial verification procedure between recalibrated baseline data and the true baseline data.

* * * * *